(12) United States Patent
Kimura et al.

(10) Patent No.: US 7,749,419 B2
(45) Date of Patent: Jul. 6, 2010

(54) METHOD AND DEVICE FOR INJECTION MOLDING

(75) Inventors: Mikihiko Kimura, Sayama (JP); Shinya Kawachi, Sayama (JP); Keisuke Andou, Wako (JP); Tadashi Nishiyama, Wako (JP); Daisuke Okonogi, Wako (JP); Naoyuki Enjoji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1124 days.

(21) Appl. No.: 10/540,329

(22) PCT Filed: Dec. 10, 2003

(86) PCT No.: PCT/JP03/15798

§ 371 (c)(1),
(2), (4) Date: Jul. 14, 2005

(87) PCT Pub. No.: WO2004/058478

PCT Pub. Date: Jul. 15, 2004

(65) Prior Publication Data

US 2006/0073226 A1     Apr. 6, 2006

(30) Foreign Application Priority Data

| Dec. 25, 2002 | (JP) | ............................. 2002-373668 |
| Dec. 25, 2002 | (JP) | ............................. 2002-374818 |
| Jan. 22, 2003 | (JP) | ............................. 2002-013877 |

(51) Int. Cl.
   *B29C 45/14* (2006.01)

(52) U.S. Cl. ....................... 264/273; 264/241; 264/250; 264/254; 264/255; 264/259

(58) Field of Classification Search ................. 264/273, 264/241, 250, 254–255, 259, 271.1, 279, 264/279.1, 294, 299; 425/129.1, 116
See application file for complete search history.

(56) References Cited

U.S. PATENT DOCUMENTS

| 5,334,010 A | * | 8/1994 | Teng ............................ 425/563 |
| 6,183,681 B1 | | 2/2001 | Sullivan et al. |
| 6,334,548 B1 | * | 1/2002 | Ichikawa et al. ............ 222/107 |

FOREIGN PATENT DOCUMENTS

| JP | 1-178416 | 7/1989 |
| JP | 02-200410 | 8/1990 |
| JP | 9-155915 | 6/1997 |
| JP | 09-155919 | 6/1997 |
| JP | 11-309746 | 11/1999 |

* cited by examiner

*Primary Examiner*—Kat Wyrozebski
*Assistant Examiner*—Xue Liu
(74) *Attorney, Agent, or Firm*—Rankin, Hill & Clark LLP

(57) ABSTRACT

An injection-molding method including preparing a first die, a second die and a third die, sandwiching a separator proper with the first die and the second die, molding a front side molded layer by injecting silicone rubber into the front side cavity through a gate, replacing the second die with a third die while the front side molded layer is still soft, and molding a rear side molded layer by piercing the front side molded layer with an injection pressure injecting the silicone rubber through the gate and filling a rear side cavity with silicone rubber through the through hole.

1 Claim, 28 Drawing Sheets

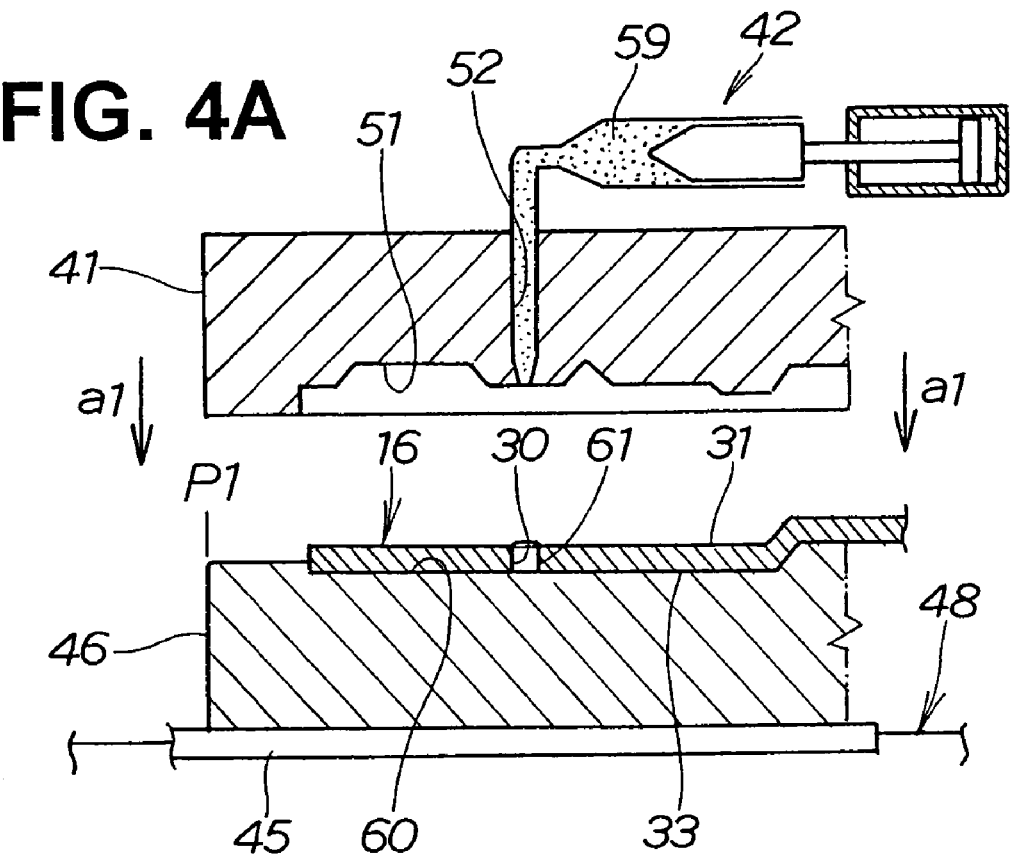
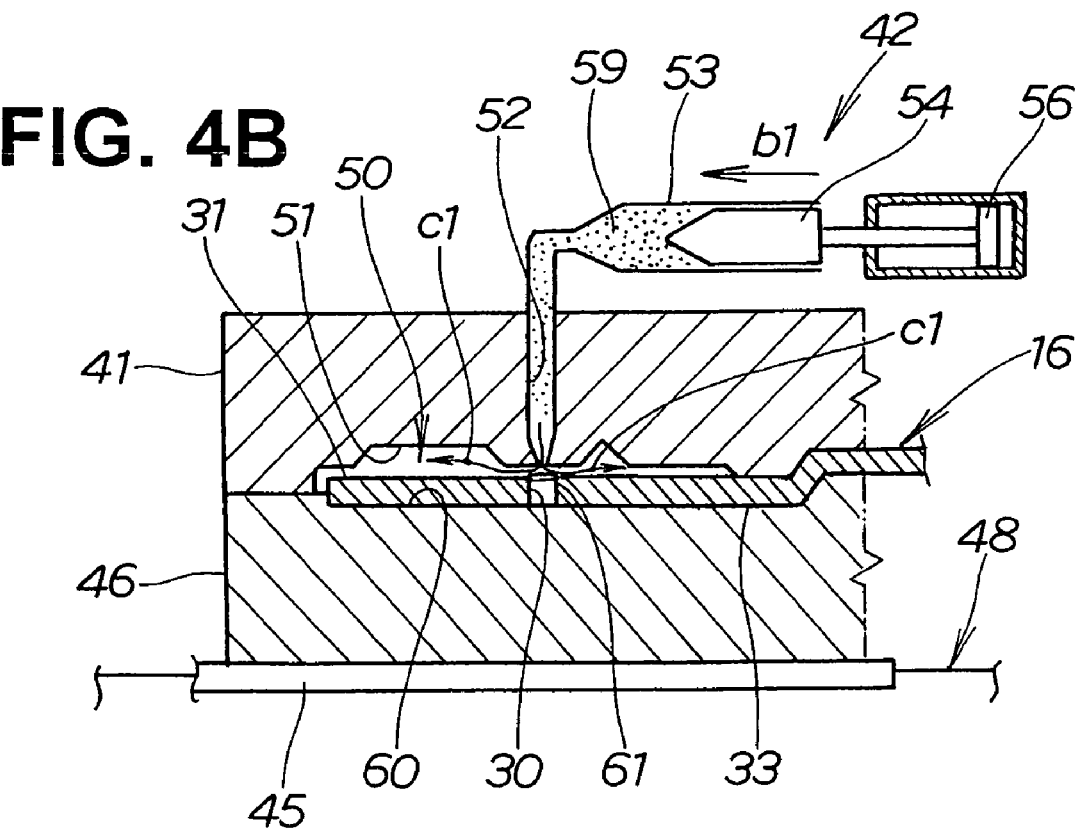

METHOD AND DEVICE FOR INJECTION MOLDING

TECHNICAL FIELD

This invention relates to an injection-molding method and apparatus, and particularly to an injection-molding method and apparatus for molding a molded layer such as a seal to both sides of a plate-shaped member.

BACKGROUND ART

A separator for use in a fuel cell has a seal made of silicon rubber molded to its periphery. As this kind of seal, for example Japanese Patent Laid-Open Publication No. 11-309746 (JP-A-11-309746), "Manufacturing Method of Silicone Resin—Metal Composite" is known. This manufacturing method of related art will be described on the basis of FIG. 28.

By an injection-molding apparatus 500 being closed, a separator proper (that is, plate-shaped member) 503 is inserted between a fixed die 501 and a moving die 502 and a cavity 504 is formed by the fixed die 501 and the moving die 502.

Molten silicone resin is injected into the cavity 504 as shown with an arrow. By this means, a front side seal (that is, molded layer) 506 is molded to the front side 505 of the separator proper 503, and seal material is made to flow around to the rear side 507 of the separator proper 503 so that a rear side seal 508 is molded.

The front side seal 506 and the rear side seal 508 together constitute a seal 509 covering a peripheral part 503a of the separator proper 503. By a seal 509 being formed on the peripheral part 503a of a separator proper 503 like this, a separator 510 is obtained.

By sandwiching an electrolyte membrane, a negative electrode and a positive electrode with this separator 510, a fuel cell is assembled. Because hydrogen gas, oxygen gas and product water flow inside this fuel cell, it is necessary for the seals of the separator to be molded well.

Here, the seal 509 is a molded membrane made of thin silicone resin, and when the molten silicone resin is injected into the cavity 504, it takes time for the front side seal 506 to be molded to the front side 505 of the separator proper 503 and for the molten silicone resin to flow around to the rear side 507 of the separator proper 503 well.

Consequently, the manufacture of the separator 510 takes time, and this has been an impediment to raising the productivity of fuel cells.

Also, when the cavity 504 is being filled with silicon resin, to make the silicone resin flow around to the rear side 507 of the separator proper 503 from the front side 505, for example an injection pressure of the silicone resin may act only on the front side 505 of the separator proper 503.

Therefore, when the separator proper 503 is a very thin plate material, there is a risk of the injection pressure of the silicone resin acting only on the front side 505 side being too great with respect to the rigidity of the separator proper 503. Consequently, it is necessary for the injection pressure of the silicone resin to be kept down, so that an excessive injection pressure does not act on the separator proper 503.

However, when the injection pressure of the silicone resin is kept down, the manufacture of the separator 510 takes time, and this has been an impediment to raising the productivity of fuel cells.

DISCLOSURE OF THE INVENTION

This invention, in a first aspect, provides an injection-molding method for covering a plate-shaped member having a through hole reaching from a front face to a rear face with a molded layer by injection-molding, the injection-molding method including: a step of preparing a first die having a gate that will face the through hole and a front side cavity face that will face the front face of the plate-shaped member, a second die having a receiving face for receiving the rear face of the plate-shaped member and a pin for blocking the through hole, and a third die having a rear side cavity face that will face the rear face of the plate-shaped member; a step of sandwiching the plate-shaped member with the first die and the second die and forming a front side cavity with the front side cavity face of the first die and the front face of the plate-shaped member; a step of molding a front side molded layer to the front face of the plate-shaped member by injecting a molding material such as resin through the gate into this front side cavity; a step of opening the through hole and forming a front side cavity with the rear side cavity face of the third die and the rear face of the plate-shaped member by replacing the second die with the third die; and a step of molding a rear side molded layer to the rear face of the plate-shaped member by piercing the front side molded layer with an injection pressure for injecting molding material through the gate and filling the rear side cavity with molding material by way of the through hole.

After a molding material such as resin is injected to the front side cavity to mold a front side molded layer, the second die is replaced with the third die. In this state, by molding material being injected through the gate, the front side molded layer is pierced under injection pressure, and a rear side molded layer is molded to the rear face of the plate-shaped member by the rear side cavity being filled with molding material through the through hole.

By the front side molded layer being pierced with injection pressure, molding material can be guided into the rear side cavity efficiently through the through hole. Consequently, it becomes possible to fill the rear side cavity with molding material rapidly.

By this means it is possible to mold a front side molded layer and a rear side molded layer respectively to the front face and the rear face of the plate-shaped member in a short time, and to raise productivity.

The invention, in a second aspect, is an injection-molding apparatus constructed to mold a front side molded layer on a front face of a plate-shaped member by sandwiching the plate-shaped member with a first die and a second die being closed and thereby forming a front side cavity with the front face of the plate-shaped member and the first die and filling this front side cavity with a molding material such as resin and to mold a rear side molded layer to the rear face of the plate-shaped member by replacing the second die with a third die and sandwiching the plate-shaped member with the third die and the first die and thereby forming a rear side cavity with the rear face of the plate-shaped member and the third die and filling this rear side cavity with a molding material such as resin; and a gate for injecting molding material into the front side cavity and the rear side cavity is provided in the first die and this gate is made to face a through hole formed in the plate-shaped member; a receiving face for making contact with the rear face of the plate-shaped member is provided on the second die and a pin able to fit in the through hole is provided on the receiving face; and to replace the second die with the third die, moving means are provided for moving the second and third dies between a facing position facing the first die and a withdrawn position away from the first die.

A pin is provided on the second die, and when the plate-shaped member is sandwiched with the first and second dies the pin fits into the through hole in the plate-shaped member and blocks the through hole. Consequently, when a molding material such as resin is filled into the front side cavity, the molding material is prevented from entering the through hole.

As a result, it is possible to remove the pin from the through hole and open the through hole by replacing the second die with the third die.

A gate is provided in the first die and this gate is made to face the through hole. Consequently, by closing the first and third dies and injecting molding material through the gate, it is possible to pierce the front side molded layer with the injection pressure produced and to guide resin to the rear side cavity efficiently through the through hole.

By this means it is possible to fill the rear side cavity with molding material rapidly and to mold molded layers to the front face and the rear face of the plate-shaped member in a short time and to raise productivity.

Also, by providing a through hole in the plate-shaped member and making the gate face the through hole, it is possible to mold molded layers to the front face and the rear face of a plate-shaped member in a short time with the simple construction of just providing one gate in the first die.

By this means it becomes possible to provide an economical injection-molding apparatus, and equipment costs can be kept down.

Preferably, support projections for supporting the plate-shaped member by abutting with it near the through hole are provided on the third die.

By support projections being provided on the third die and these support projections being made to abut with the vicinity of the through hole, the plate-shaped member around the through hole is supported. Therefore, even when an injection pressure acts on the area of the plate-shaped member around the through hole, that area is prevented from deforming.

This makes it possible to apply the injection-molding apparatus to an extremely thin plate-shaped member, and an enlargement of its range of use can be achieved.

The invention, in a third aspect, provides an injection-molding method for covering a front face and a rear face of a plate-shaped member with a molded layer by injection-molding, the injection-molding method including: a step of preparing a first die having a front side cavity face that will face the front face of the plate-shaped member and a first gate opening at this front side cavity face and a first pressure sensor fronted on the front side cavity face and preparing a second die having a rear side cavity face that will face the rear face of the plate-shaped member and a second gate opening at the rear side cavity face and a second pressure sensor fronted on the rear side cavity face; a step of sandwiching the plate-shaped member with the first die and the second die and thereby forming a front side cavity with the front side cavity face of the first die and the front face of the plate-shaped member and forming rear side cavity with the rear side cavity face of the second die and the rear face of the plate-shaped member; a step of injecting a molding material such as resin through the first gate into the front side cavity and injecting a molding material through the second gate into the rear side cavity; and a step of stopping the injection of molding material into the front side cavity when a measured value of the first pressure sensor reaches a prescribed value and stopping the injection of molding material into the rear side cavity when a measured value of the second pressure sensor reaches a prescribed value, to mold front and rear side molded layers respectively in the front and rear side cavities.

First and second gates are made to face on the front side cavity and the rear side cavity respectively, and molding material is injected into the front side cavity through the first gate and molding material is injected into the rear side cavity through the second gate.

By molding material being injected into the front and rear side cavities through respective separate first and second gates, molding material is guided into the front and rear side cavities efficiently and filled into the front and rear side cavities rapidly.

Also, by the internal pressures of the front and rear side cavities being detected with first and second pressure sensors, the internal pressures of the front and rear side cavities are kept constant. By this means, molding material is injected into each of the front side cavity and the rear side cavity optimally.

By injecting molding material into the front and rear side cavities rapidly and optimally like this, it is possible to mold a front side molded layer and a rear side molded layer respectively to the front face and the rear face of the plate-shaped member well in a short time, and raise productivity.

Also, by the internal pressures of the front and rear side cavities being kept constant, the flow of molding material is controlled so that there is no difference in internal pressure between the front and rear side cavities as injection of the molding material is carried out.

By eliminating any internal pressure difference between the front and rear side cavities like this, it is possible to reduce the load acting on the plate-shaped member.

The invention, in a fourth aspect, is an injection-molding apparatus constructed to sandwich a plate-shaped member with first and second dies and thereby form a front side cavity with a front face of the plate-shaped member and the first die and form a rear face cavity with a rear face of the plate-shaped member and the second die and fill the front and rear side cavities with a molding material such as resin to mold a front side molded layer to the front face of the plate-shaped member and mold a rear face molded layer to the rear face of the plate-shaped member; and in the first die it has a first gate facing the front side cavity and a first pressure sensor for measuring the internal pressure of the front side cavity; in the second die it has a second gate facing the rear side cavity and a second pressure sensor for measuring the internal pressure of the rear side cavity; and it has control means for stopping the injection of molding material into the front side cavity on the basis of a signal from the first pressure sensor when the internal pressure of the front side cavity has reached a prescribed value and stopping the injection of molding material into the rear side cavity on the basis of a signal from the second pressure sensor when the internal pressure of the rear side cavity has reached a prescribed value.

A first gate fronting on the front side cavity is provided in the first die and a second gate fronting on the rear side cavity is provided in the second die.

By this means, molding material is injected into the front and rear side cavities through the first and second gates individually, and molding material can be guided into the front and rear side cavities efficiently and the front and rear side cavities can be filled rapidly.

Also, a first pressure sensor is provided in the first die and a second pressure sensor is provided in the second die, and control means is provided for keeping the internal pressures of the front and rear side cavities constant on the basis of internal pressure data detected by the first and second pressure sensors.

By this means, the front and rear side cavities are each filled with molding material optimally.

By filling the front and rear side cavities with molding material rapidly and optimally like this, it is possible to mold a front side molded layer and a rear side molded layer respectively to the front face and the rear face of plate-shaped member well in a short time, and to raise productivity.

Also, first and second pressure sensors and a control part are provided. Accordingly, control of the flows of molding material is carried out so that the internal pressures of the front and rear side cavities are kept constant and there is no internal pressure difference between the front and rear side cavities as injection of molding material is carried out.

By eliminating any internal pressure difference between the front and rear side cavities like this, it is possible to reduce the load acting on the plate-shaped member.

The invention, in a fifth aspect, provides an injection-molding method for covering a front face and a rear face of a plate-shaped member with a molded layer by injection-molding, the injection-molding method including: a step of preparing a first die having a front side cavity face that will cover the front face of the plate-shaped member and a first gate opening at the front side cavity face and a second gate avoiding the front side cavity face and switching means for guiding molding material to either one of the first and second gates, preparing a second die having a receiving face for receiving the rear face of the plate-shaped member, and preparing a third die having a rear side cavity face that will cover the rear face of the plate-shaped member and a connecting passage that will cause the second gate to open at the rear side cavity face; a step of sandwiching the plate-shaped member with the first die and the second die and forming a front side cavity with the front side cavity face of the first die and the front face of the plate-shaped member; a step of injecting a molding material such as resin through the first gate into the front side cavity to mold a front side molded layer; a step of replacing the second die with the third die and thereby forming a front side cavity with the rear side cavity face of the third die and the rear face of the plate-shaped member; and a step of injecting a molding material through the second gate and the connecting passage into the rear side cavity to mold a rear side molded layer.

After molding material is injected into the front side cavity through the first gate to mold a front side molded layer, the second die is replaced with the third die. In this state, by the switching means being switched and molding material being injected through the second gate, the rear side cavity is filled with molding material via the connecting passage to mold a rear side molded layer on the rear face of the plate-shaped member.

In this way, molding material guided to the second gate is guided efficiently into the rear side cavity through the connecting passage, and the rear side cavity is filled with molding material rapidly.

As a result, it is possible to mold the front side molded layer and rear side molded layer are respectively molded on the front face and the rear face of the plate-shaped member in a short time and productivity can be improved.

The invention, in a sixth aspect, is an injection-molding apparatus constructed to mold a front side molded layer to a front face of a plate-shaped member by closing first and second dies and sandwiching the plate-shaped member and thereby forming a front side cavity with the front face of the plate-shaped member and the first die and filling this front side cavity with a molding material such as resin and to mold a rear side molded layer to a rear face of the plate-shaped member by replacing the second die with a third die and sandwiching the plate-shaped member with the third die and the first die and thereby forming a rear face cavity with the rear face of the plate-shaped member and the third die and filling this rear face cavity with molding material; and the first die is provided with a first gate facing the front side cavity and a second gate avoiding the rear side cavity and switching means for guiding molding material to either one of the first and second gates; the second die is provided with a receiving face for making contact with the rear face of the plate-shaped member; the third die is provided with a connecting passage for connecting the second gate to the rear side cavity; and to replace the second die with the third die, moving means are provided for moving the second and third dies between a facing position facing the first die and a withdrawn position away from the first die.

By the first gate of the first die being made to front on the front side cavity, a front side molded layer is molded by injecting molding material into the front side cavity through the first gate. By the second gate of the first die being made to connect with the rear side cavity by way of the connecting passage in the third die, the rear side cavity is filled with molding material to mold a rear side molded layer to the rear face of the plate-shaped member.

Therefore, molding material guided to the second gate is guided efficiently into the rear side cavity through the connecting passage and the rear side cavity is filled with molding material rapidly.

By this means it is possible to mold molded layers on the front face and the rear face of a plate-shaped member in a short time and to raise productivity.

Also, molded layers are molded to the front face and the rear face of the plate-shaped member in a short time with a simple construction of just providing first and second gates and switching means in the first die and providing a connecting passage in the third die.

As a result it is possible to provide an economical injection-molding apparatus, and equipment costs can be kept down.

Preferably, the front side cavity and the rear side cavity are formed so that the front side molded layer and the rear side molded layer are extended to the outer edge of the plate-shaped member and the two layers are made to make contact.

The front side molded layer and the rear side molded layer are each extended to the outer edge of the plate-shaped member, and are made to make contact with each other at the outer edge.

By this means it is possible to cover the outer edge of the plate-shaped member with a molding layer without fail and certainly prevent corrosion from occurring in the plate-shaped member.

BRIEF DESCRIPTION OF THE DRAWINGS

FIG. 4A and FIG. 4B are explanatory views showing an example of injecting molten silicone rubber into a front side cavity in an injection-molding method according to the first embodiment.

BEST MODE FOR CARRYING OUT THE INVENTION

Figure 1:
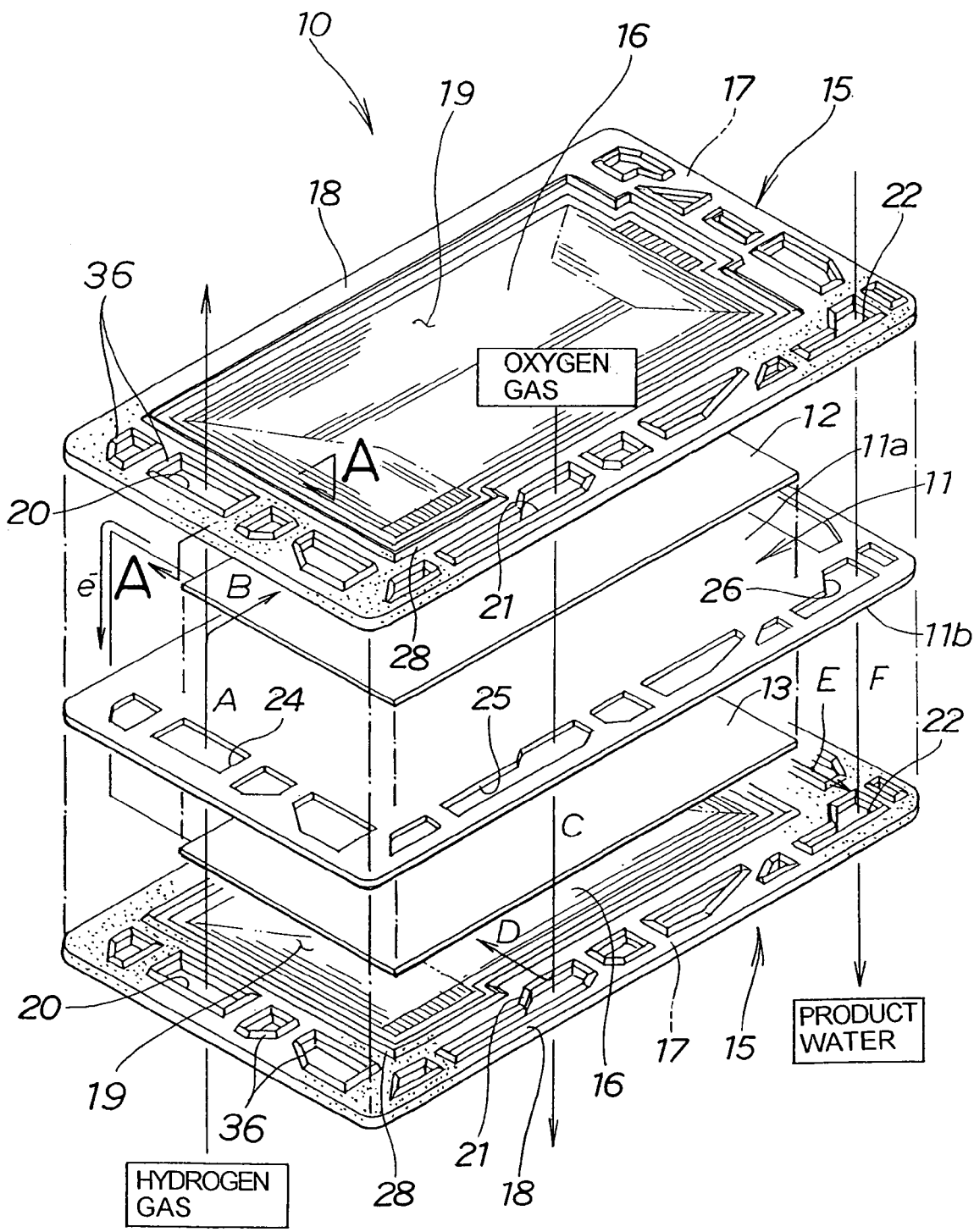
FIG. 1 is an exploded perspective view of a fuel cell having a separator molded in an injection-molding apparatus according to a first embodiment of the invention.

As shown in FIG. 1, a fuel cell 10 is made by placing a negative electrode 12 and a positive electrode 13 respectively on an upper face 11a side and a lower face 11b side of an electrolyte membrane 11, and stacking an upper side separator 15 on the negative electrode 12 and stacking a lower side separator 15 on the positive electrode 13.

Each separator 15 has a silicone rubber seal (a molded layer made up of a front side molded layer and a rear side molded layer) 18 on a peripheral part 17 of a metal separator proper (plate-shaped member) 16.

The separator proper 16 has hydrogen gas passages, oxygen gas passages and product water passages (not shown) in the peripheral part 17. By this peripheral part 17 being covered with the silicone rubber seal 18, the edges of the hydrogen gas passages, the edges of the oxygen gas passages and the edges of the product water passages are covered by the seal 18 to form hydrogen gas passages 20 . . . , oxygen gas passages 21 . . . and product water passages 22 . . .

The seal 18 has molded integrally therewith a ridge part 28 that surrounds a central part 19 of the separator 15.

By the peripheral part 17 of the separator proper 16 being covered with the seal 18, the hydrogen gas passages 20 . . . , the oxygen gas passages 21 . . . and the product water passages 22 . . . are provided with corrosion resistance with respect to gases and product water.

The electrolyte membrane 11 has hydrogen gas passages 24 . . . , oxygen gas passages 25 . . . and product water passages 26 . . . in its peripheral part.

In this fuel cell 10, hydrogen gas can be supplied through the hydrogen gas passages 20 . . . , 24 . . . as shown by the arrows A and guided toward the upper side of the central part 19 of the separator 15 as shown by the arrow B, and oxygen gas can be supplied through the oxygen gas passages 21 . . . , 25 . . . as shown by the arrow C and guided toward the lower side of the central part 19 of the separator 15 as shown by the arrow D.

In this way, hydrogen gas is brought into contact with a catalyst included in the negative electrode 12 and oxygen gas is brought into contact with a catalyst included in the positive electrode 13, electrons e⁻ are caused to flow as shown with arrows, and a current is produced.

At this time, product water is produced from hydrogen molecules and oxygen molecules, and this product water is guided from the central part 19 of the separator 15 as shown by the arrow E to the product water passages 22 . . . , 26 . . . and made to flow through the product water passages 22 . . . , 26 . . . as shown by the arrow F.

Figure 2:
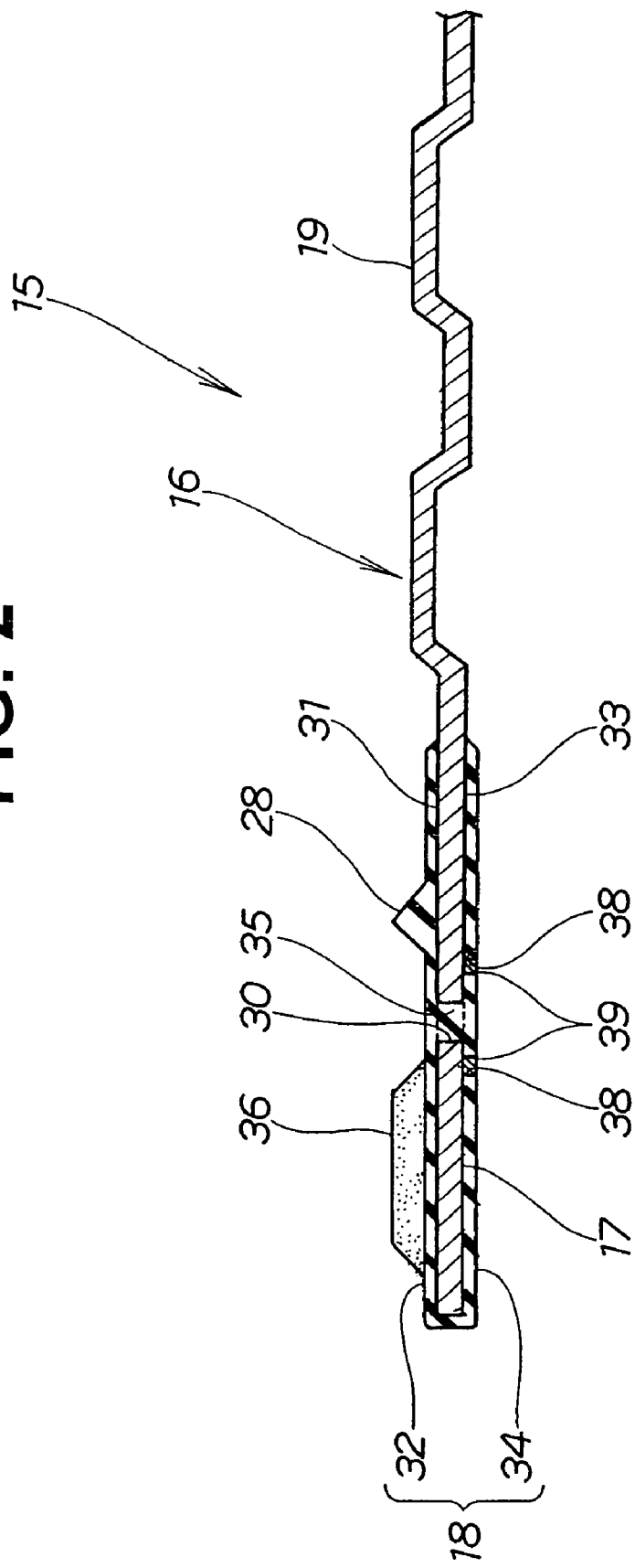
FIG. 2 is a sectional view on the line A-A in FIG. 1.

As shown in FIG. 2, in the separator 15, a through hole 30 is provided in the peripheral part 17 of the separator proper 16; a front side molded layer (a front face side area of the seal 18) 32 is molded to the front face 31 of the separator proper 16; a rear side molded layer (a rear face side area of the seal 18) 34 is molded to the rear face 33 of the separator proper 16; and a filling part (a part of the seal 18) 35 fills the through hole 30.

The front side molded layer 32 has integrally provided therewith the ridge part 28, which surrounds the central part 19 of the separator proper 16, and has protrusions 36 constituting passages such as the hydrogen gas passages 20, oxygen gas passages 21 and product water passages 22 shown in FIG. 1.

The rear side molded layer 34 has void parts 38 . . . near the through hole 30 and plug parts 39 (the same resin material as the seal 18) plug the void parts 38 . . . .

An injection-molding apparatus 40 (see FIG. 3) for molding the seal 18 will now be described.

Figure 3:
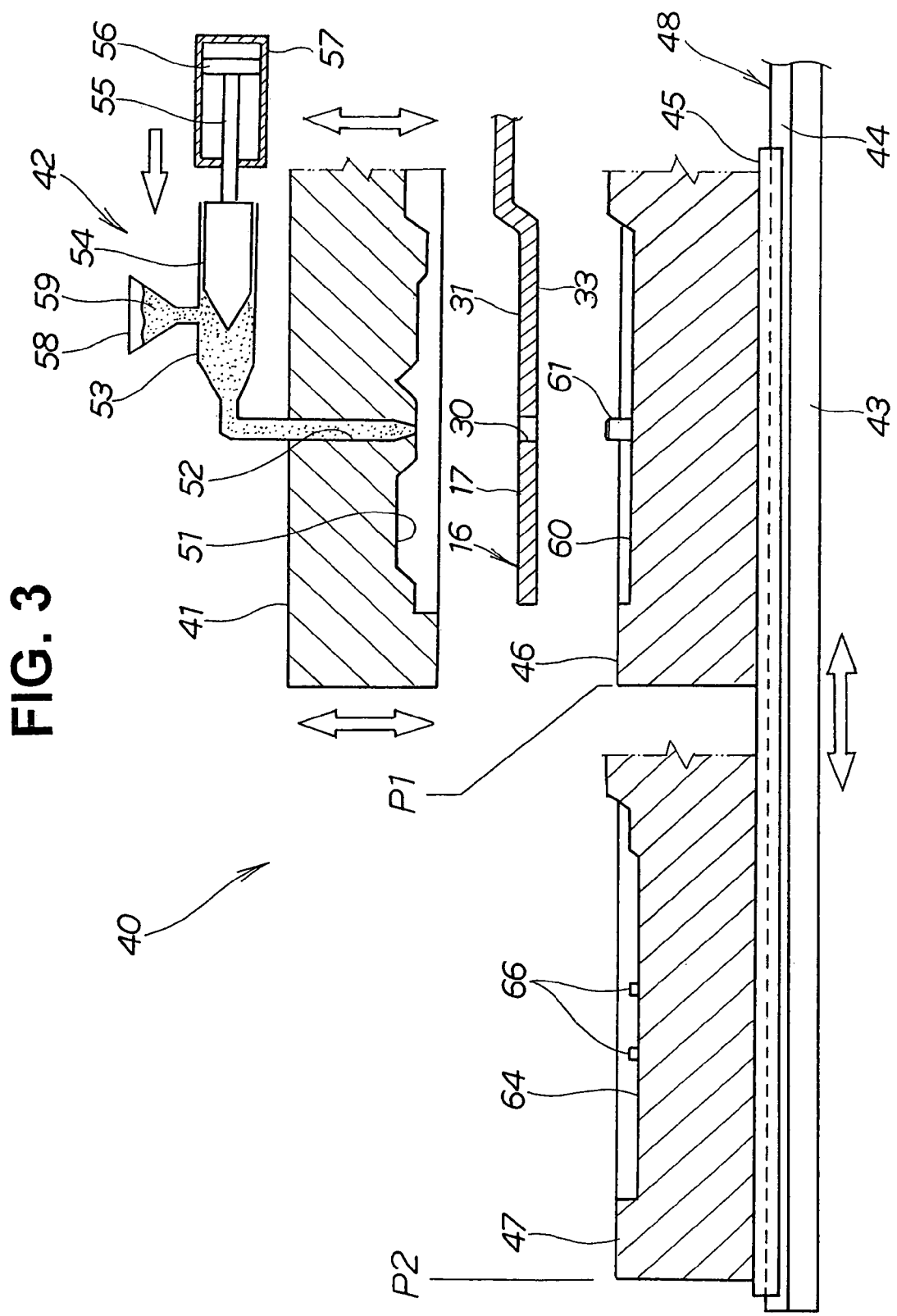
FIG. 3 is a sectional view showing an injection-molding apparatus according to the first embodiment of the invention.

As shown in FIG. 3, the injection-molding apparatus 40 is made up of a first die 41 provided movably up and down as shown with arrows, injecting means 42 mounted on this first die 41, a bed 43 disposed below the first die 41, moving means 48 for sliding a slider 45 along a guide rail 44 of this bed 43, and second and third dies 46, 47 mounted on this slider 45.

This moving means 48 is made up of the guide rail 44 provided on the bed 43, the slider 45 mounted slidably along the guide rail 44 in the direction shown with arrows, and an actuator (not shown) such as a cylinder for moving the slider 45 along the guide rail 44.

The first die 41 has a front side cavity face 51 that forms a front side cavity 50 (see FIG. 4B) together with the front face 31 of a separator proper 16 when the first die 41 is closed onto the second die 46.

This front side cavity face 51 also forms a front side cavity 50 (see FIG. 4B) together with the front face 31 of the separator proper 16 when the first die 41 is closed onto the third die 47.

The injecting means 42 has a gate 52 which is provided in the first die 41 and opens at the front side cavity face 51 and an injection cylinder 53 connecting with the gate 52; a plunger 54 is movably disposed inside the injection cylinder 53, this plunger 54 is connected by a rod 55 to a piston 56, and this piston 56 is movably disposed inside a cylinder 57.

By the outlet of a hopper 58 being connected to the injection cylinder 53, a resin material, that is, molten silicone rubber (molding material), 59 in the hopper 58 is fed into the injection cylinder 53.

After molten silicone rubber 59 poured into the hopper 58 is fed through the outlet into the injection cylinder 53, by the piston 56 being moved in the direction of the arrow, the plunger 54 is pushed out and silicone rubber 59 inside the injection cylinder 53 is injected through the gate 52 into the front side cavity 50 (see FIG. 4B).

The second die 46 is mounted on the slider 45 and has at its top a receiving face 60 that makes contact with the rear face 33 of the separator proper 16 when the first die 41 is closed onto the second die 46 and has a pin 61 on the receiving face 60.

This pin 61 fits in the through hole 30.

The third die 47 is mounted on the slider 45 and has a rear side cavity face 64 that forms a rear side cavity 63 (see FIG. 6B) with the rear face 33 of the separator proper 16 when the first die 41 is closed onto the third die 47, and has support projections 66 . . . on the rear side cavity face 64.

The support projections 66 . . . are for supporting the separator proper 16 by abutting with a part of the separator proper 16 near the through hole 30.

Although only two support projections 66 . . . are shown in the figure, to support the separator proper 16 efficiently it is desirable that for example three be provided.

The moving means 48 is means for moving the slider 45 in the direction of the arrows, and moves the second die 46 and the third die 47 to a facing position Pi facing the first die 41 and moves the second die 46 and the third die 47 to a withdrawn position P2 away from the first die 41.

Next, an injection-molding method for molding a seal 18 (see FIG. 2) to the peripheral part 17 of the separator proper 16 using the injection-molding apparatus 40 will be described, on the basis of FIG. 3 through FIG. 8.

First, the injection-molding apparatus 40 shown in FIG. 3, i.e. a first die 41 having a gate 52 that will face the through hole 30 and a front side cavity face 51 that will cover the front face 31 of a separator proper 16, a second die 46 having a receiving face 60 to receive the rear face 33 of a separator proper 16 without forming a cavity and a pin 61 to block the through hole 30, and a third die 47 having a rear side cavity face 64 to cover the rear face 33 of a separator proper 16 and support projections 66 . . . to support the separator proper 16, is prepared.

FIG. 4A and FIG. 4B are explanatory views showing an example of injecting molten silicone rubber into a front side cavity in an injection-molding method of a first embodiment.

In FIG. 4A, by the slider 45 being moved with the moving means 48, the second die 46 is set to the facing position P1, and the second die 46 is thus made to face the first die 41.

Then, by a separator proper 16 being received onto the receiving face 60 of the second die 46, the rear face 33 of the separator proper 16 is brought into contact with the receiving face 60 and the pin 61 is fitted in the through hole 30 and the through hole 30 is blocked by the pin 61.

In this state, the first die 41 is lowered as shown by the arrows a1 and the first and second dies 41, 46 are clamped together.

In FIG. 4B, by the separator proper 16 being sandwiched between the first die 41 and the second die 46, a front side cavity 50 is formed by the front face 31 of the separator proper 16 and the front side cavity face 51 of the first die 41.

Then, the plunger 54 is moved with the piston 56 of the injecting means 42 as shown by the arrow b1. This causes molten silicone rubber 59 inside the injection cylinder 53 to pass through the gate 52 and be injected into the front side cavity 50 as shown by the arrows c1.

Figure 5A:
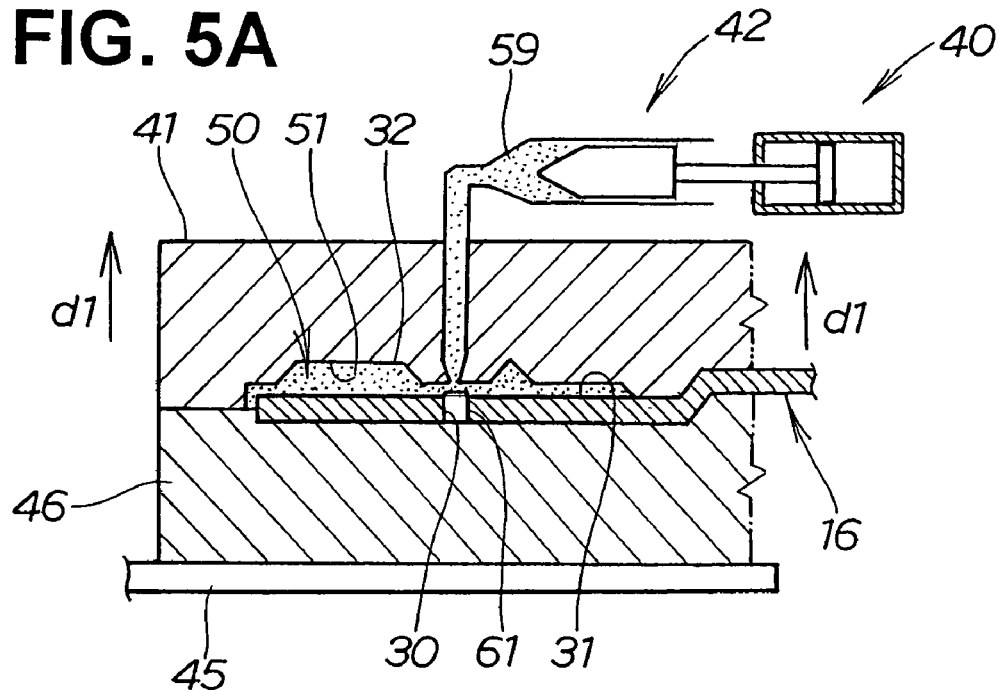
FIG. 5A and FIG. 5B are explanatory views showing an example of molding a front side molded layer to a separator proper in the injection-molding method of the first embodiment.
Figure 5B:
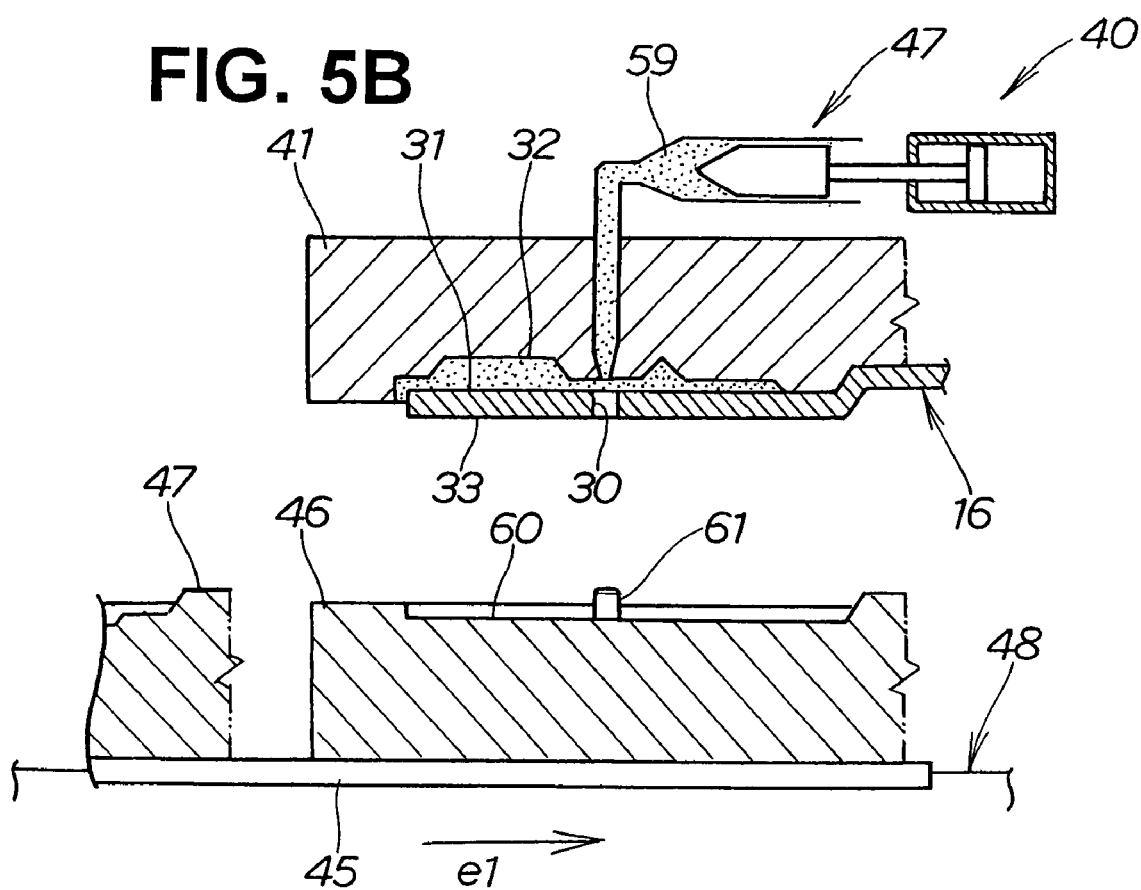

FIG. 5A and FIG. 5B are explanatory views showing an example of molding a front side molded layer to a separator proper in the injection-molding method of the first embodiment.

In FIG. 5A, by molten silicone rubber 59 being injected into the front side cavity 50, a front side molded layer 32 is molded to the front face 31 of the separator proper 16.

Because the pin 61 fits in the through hole 30 of the separator proper 16 and blocks the through hole 30, it prevents the silicone rubber 59 from entering the through hole 30.

Next, the first die 41 is moved as shown by the arrows d1 to part the dies.

In FIG. 5B, when the first die 41 is opened, the separator proper 16 is moved together with the first die 41 so that the separator proper 16 moves away from the second die 46. This removes the through hole 30 from the pin 61 and opens the through hole 30.

Next, the moving means 48 is operated to move the slider 45 as shown by the arrow e1.

Figure 6A:
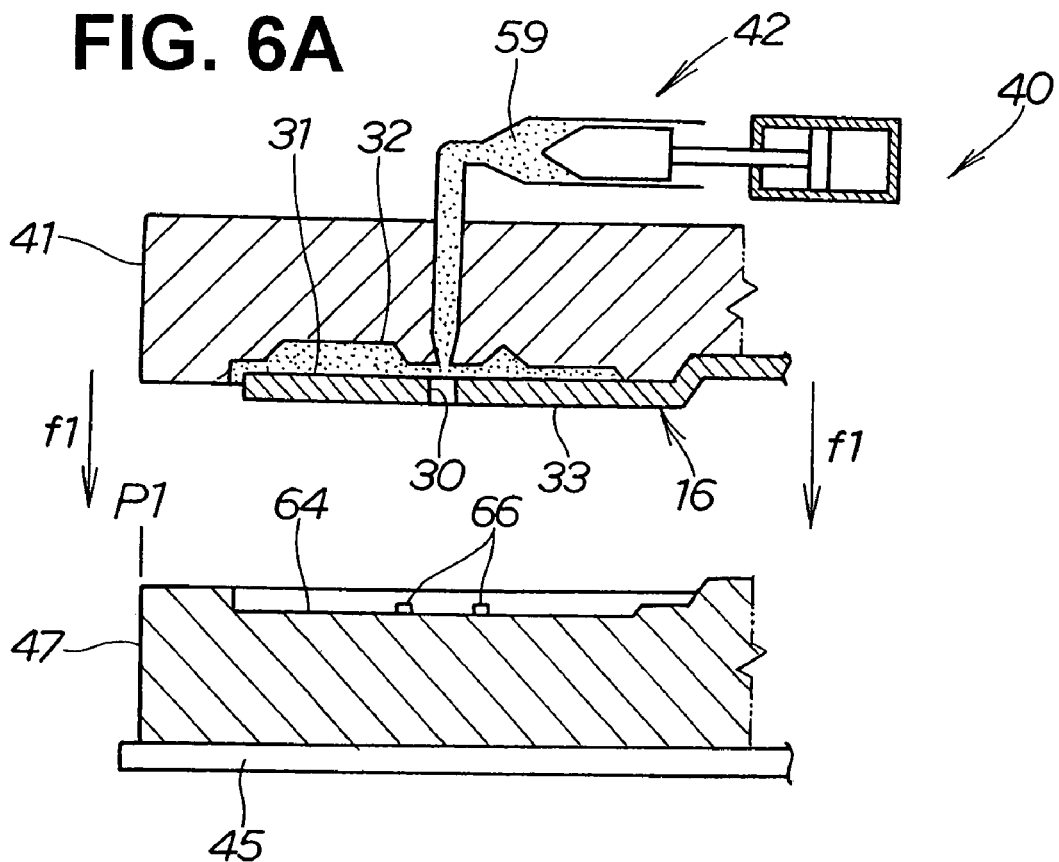
FIG. 6A and FIG. 6B are explanatory views showing an example of forming a rear side cavity in the injection-molding method of the first embodiment.
Figure 6B:
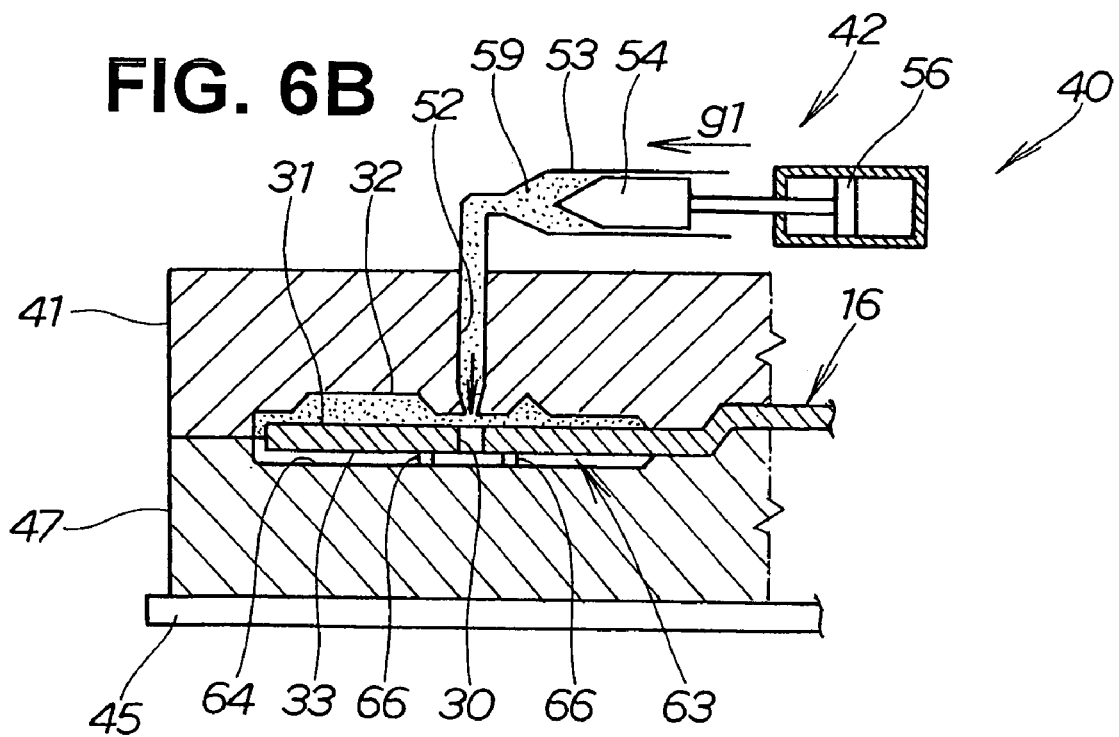

FIG. 6A and FIG. 6B are explanatory views showing an example of molding a rear side cavity in the injection-molding method of the first embodiment.

In FIG. 6A, the third die 47 is set in the facing position P1, so that the third die 47 faces the first die 41.

Then, by the first die 41 being lowered as shown by the arrows f1, the first and third dies 41, 47 are closed while the front side molded layer 32 is still soft. This completes a mold-closing with the second die 46 (see FIG. 5B) replaced with the third die 47.

In FIG. 6B, by the separator proper 16 being sandwiched between the first die 41 and the third die 47, a rear side cavity 63 is formed by the rear face 33 of the separator proper 16 and the rear side cavity face 64 of the third die 47.

At the same time, the support projections 66 . . . abut with the area of the separator proper 16 around the through hole 30.

Then, by the plunger 54 being moved with the piston 56 as shown by the arrow g1, molten silicone rubber 59 in the injection cylinder 53 is injected through the gate 52 toward the front side molded layer 32 as shown with an arrow.

Figure 7A:
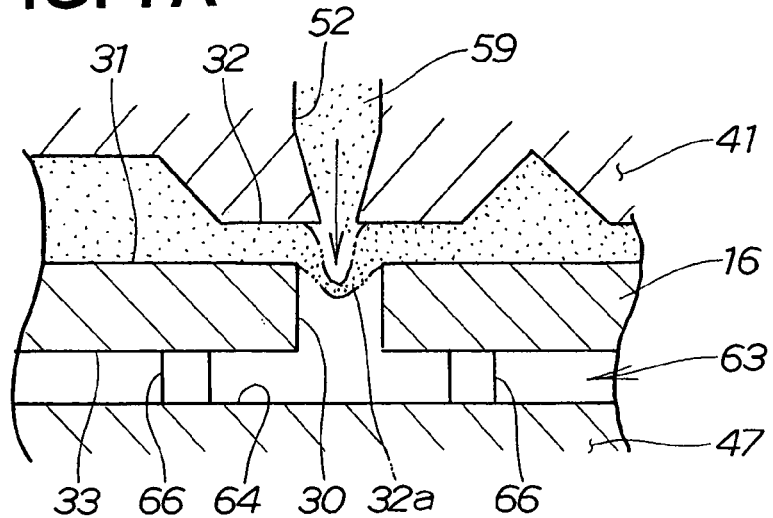
FIG. 7A through FIG. 7C are explanatory views showing an example of filling a rear side cavity with molten silicone rubber in the injection-molding method of the first embodiment.
Figure 7B:
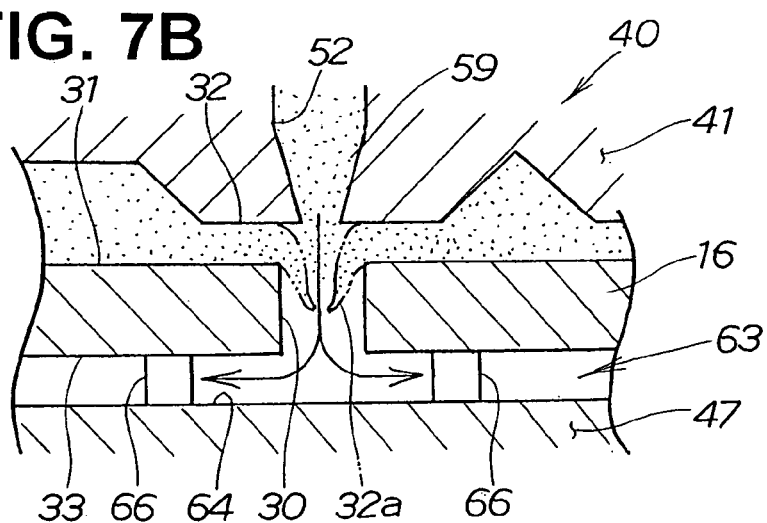
Figure 7C:
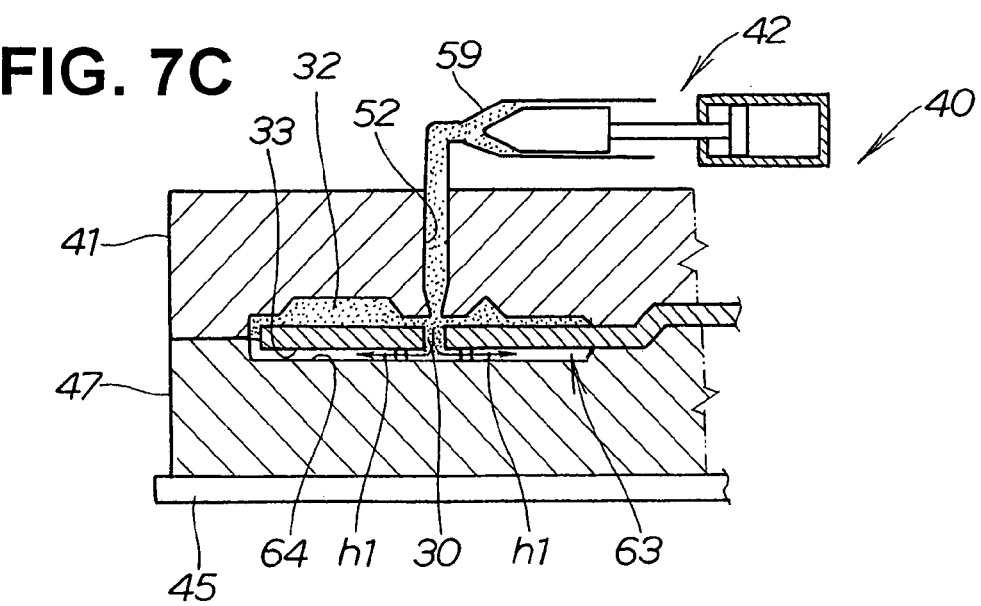

FIG. 7A and FIG. 7C are explanatory views showing an example of injecting molten silicone rubber into the rear side cavity in the injection-molding method of the first embodiment.

In FIG. 7A, the gate 52 is disposed so as to face the through hole 30. In this state, molten silicone rubber 59 is injected through the gate 52 toward the front side molded layer 32 as shown with an arrow.

Consequently, the injection pressure of the molten silicone rubber 59 acts on the soft front side molded layer 32, and of the front side molded layer 32 an area 32a over the through hole 30 stretches and enters the through hole 30.

The area 32a of the front side molded layer 32 gradually becomes thin as it stretches under the injection pressure of the molten silicone rubber 59.

In FIG. 7B, as a result of the area 32a of the front side molded layer 32 becoming thin, this area 32a opens under the injection pressure of the molten silicone rubber 59. Consequently, silicone rubber 59 injected through the gate 52 is guided through the through hole 30 to the rear side cavity 63 as shown with arrows.

At this time, the support projections 66 . . . are in abutment with the rear face 33 of the separator proper 16 near the through hole 30. Consequently, the separator proper 16 in the vicinity of the through hole 30 is supported by the support projections 66 . . . .

As a result of the separator proper 16 being supported by the support projections 66 . . . , even when the injection pressure acts on the area of the separator proper 16 around the through hole 30, this area is prevented from deforming.

Therefore, the injection-molding apparatus 40 can be applied even when the separator proper 16 is extremely thin, and an enlargement of the range of use of the injection-molding apparatus 40 can be achieved.

In FIG. 7C, silicone rubber 59 having reached the rear side cavity 63 is guided into the rear side cavity 63 as shown by the arrows h1.

In this way, by piercing the area 32a (see FIG. 7B) of the front side molded layer 32 with injection pressure and guiding molten silicone rubber 59 to the rear side cavity 63 through the through hole 30, silicone rubber 59 is efficiently injected into the rear side cavity 63.

Figure 8A:
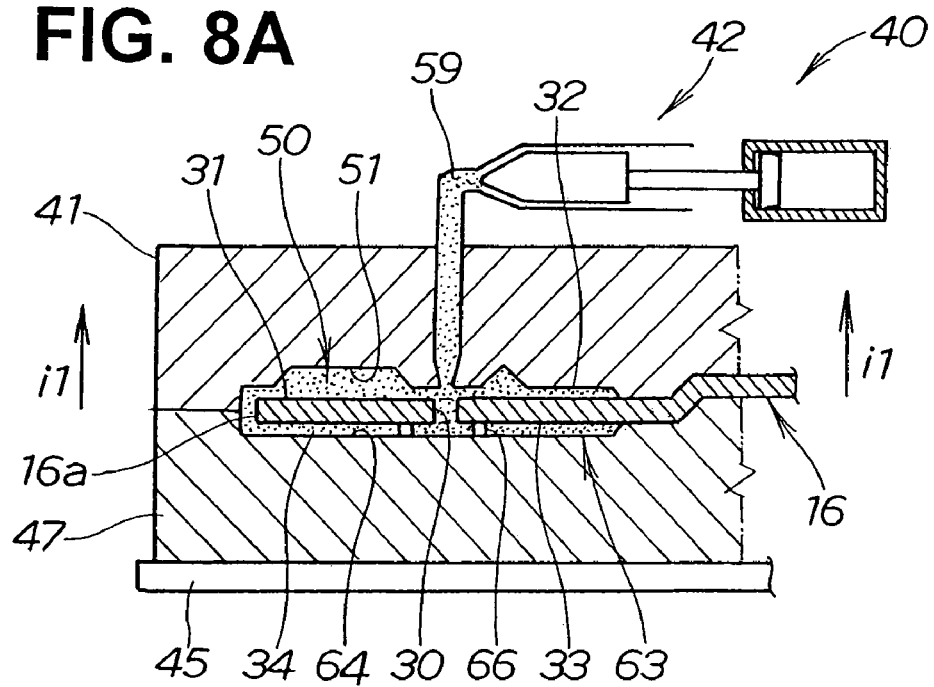
FIG. 8A and FIG. 8B are enlarged views showing an example of covering a separator proper with a front side molded layer and a rear side molded layer in the injection-molding method of the first embodiment.
Figure 8B:
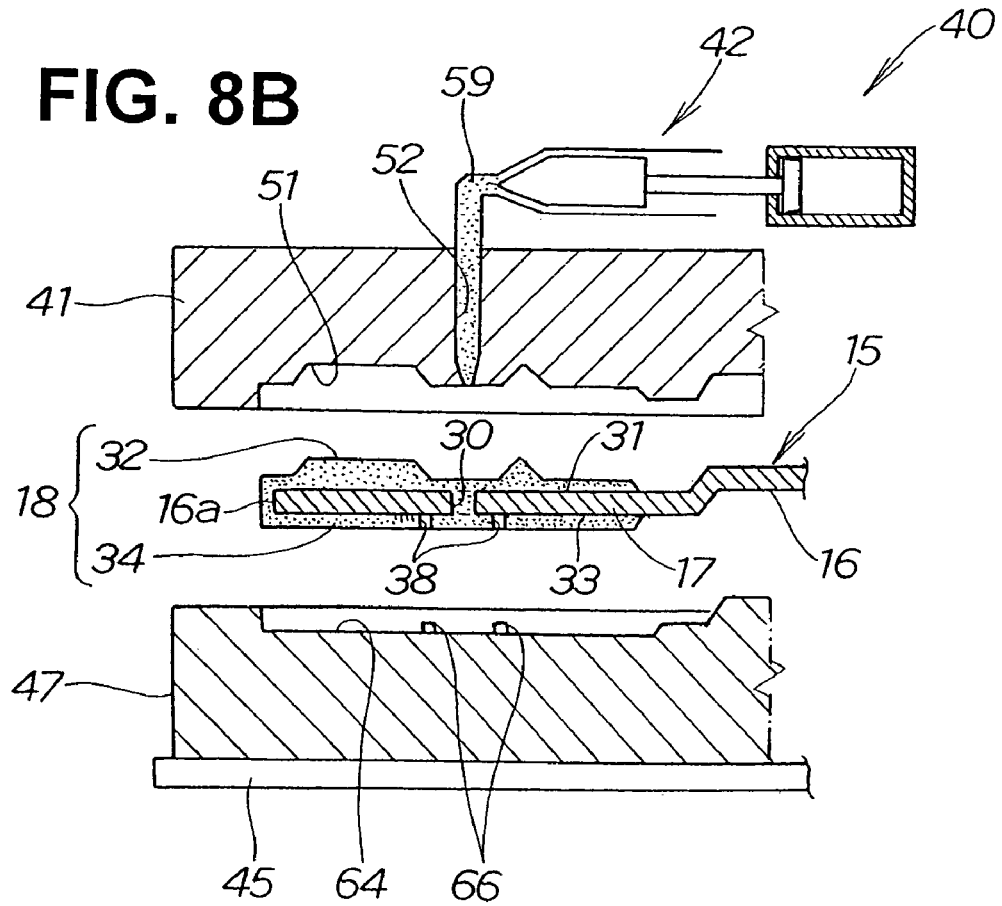

FIG. 8A and FIG. 8B are explanatory views showing an example of covering a separator proper with a front side molded layer and a rear side molded layer in the injection-molding method of the first embodiment.

In FIG. 8A, molten silicone rubber 59 fills the rear side cavity 63 and molds a rear side molded layer 34 onto the rear face 33 of the separator proper 16. At the same time, molten silicone rubber 59 fills the through hole 30.

The outer edge 16a of the separator proper 16 is disposed a predetermined gap from the front side cavity face 51 of the first die 41 and is disposed a predetermined gap from the rear face cavity face 64 of the third die 47.

Therefore, when the first and third dies 41, 47 are closed, the front side cavity 50 formed by the first die 41 and the separator proper 16 and the rear side cavity 63 formed by the third die 47 and the separator proper 16 extend around the outer edge 16a of the separator proper 16 and connect with each other.

Consequently, the rear side molded layer 34 is guided to the outer edge 16a of the separator proper 16 and caused to connect with the front side molded layer 32, which extends to the outer edge 16a of the separator proper 16.

Because the outer edge 16a of the separator proper 16 can be covered with the front side molded layer 32 and the rear side molded layer 34, that is, with a seal 18 (see FIG. 8B), corrosion can be prevented from occurring in the separator proper 16.

After the separator proper 16 is covered with the front side molded layer 32 and the rear side molded layer 34, the first die 41 is moved as shown by the arrows i1 to open the mold.

In FIG. 8B, a separator 15 obtained by covering the separator proper 16 with a seal 18 is removed from the first and third dies 41, 47.

At this time, as a result of the support projections 66 . . . being moved away from the separator proper 16, void parts 38 are formed in the rear side molded layer 34.

Accordingly, the void parts 38 . . . are plugged with plug parts 39 (see FIG. 2) to complete the process of manufacturing the separator 15.

As explained in the first embodiment of FIG. 1 through FIG. 8B, in an injection-molding method according to the invention, an area 32a of the front side molded layer 32 is pierced through with an injection pressure of molten silicone rubber 59, and silicone rubber 59 is efficiently guided into the rear side cavity 63 through the through hole 30.

Thus the rear side cavity 63 can be filled with silicone rubber 59 rapidly, and front and rears side molded layers 32, 34, that is, a seal 18, can be molded to the front face 31 and the rear face 33 of a separator proper 16 in a short time.

Also, a through hole 30 is provided in the separator proper 16, and the gate 52 of the first die 41 is made to face the through hole 30.

Therefore, with the simple construction of just providing the single gate 52 in the first die 41, as described above it is possible to mold a seal 18 to the front face 31 and the rear face 33 of a separator proper 16 in a short time.

By this means it is possible to provide an economical injection-molding apparatus 40.

Second through fifth embodiments will now be described on the basis of FIG. 9 through FIG. 27. In the second through fifth embodiments, parts the same as parts in the first embodiment have been given the same reference numerals and will not be described again.

SECOND EMBODIMENT

Figure 9:
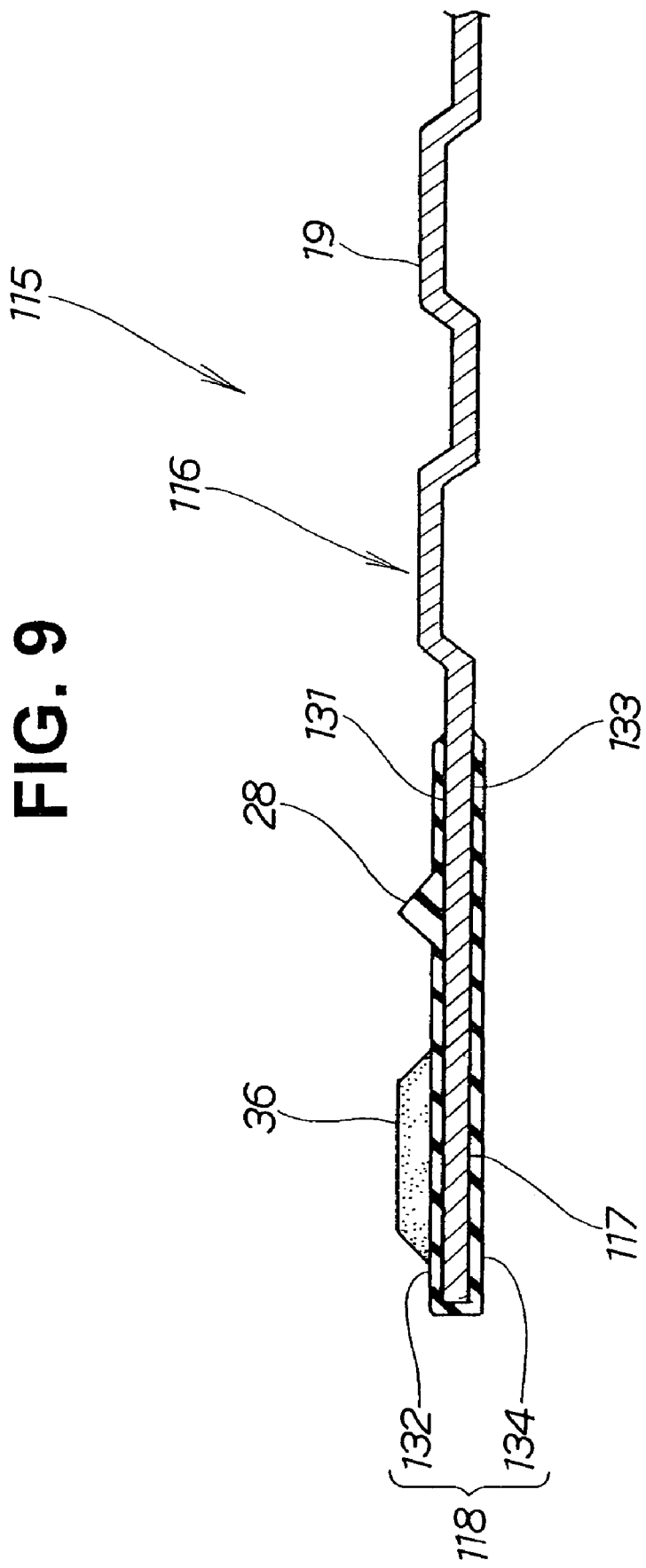
FIG. 9 is a sectional view of a separator molded with an injection-molding apparatus according to a second embodiment of the invention.

As shown in FIG. 9, a separator 115 is made by covering a peripheral part 117 of a separator proper 116 with a seal 118 made of silicon rubber.

The separator 115 of the second embodiment is the separator 15 of the first embodiment shown in FIG. 2 with the through hole 30 in the peripheral part 17 removed, and otherwise its construction is the same as the separator 15 of the first embodiment.

The seal 118 is made by molding a front side molded layer (a front face side area of the seal 118) 132 to the front face 131 of the separator proper 116 and molding a rear side molded layer (a rear face side area of the seal 118) 134 to the rear face 133 of the separator proper 116, at the peripheral part 117 of the separator proper 116.

The peripheral part 117 is covered with the seal 118, and the edges of hydrogen gas passages, the edges of oxygen gas passages and the edges of product water passages are covered by the seal 118 and form the hydrogen gas passages 20 . . . , oxygen gas passages 21 . . . and product water passages 22 . . . shown in FIG. 1.

The front side molded layer 132 has integrally therewith a ridge part 28 that surrounds the central part 19 of the separator proper 116, and has protrusions 36 constituting passages such as the hydrogen gas passages 20, oxygen gas passages 21 and product water passages 22 shown in FIG. 1.

Next, an injection-molding apparatus 140 (see FIG. 10) for molding the seal 118 will be described.

Figure 10:
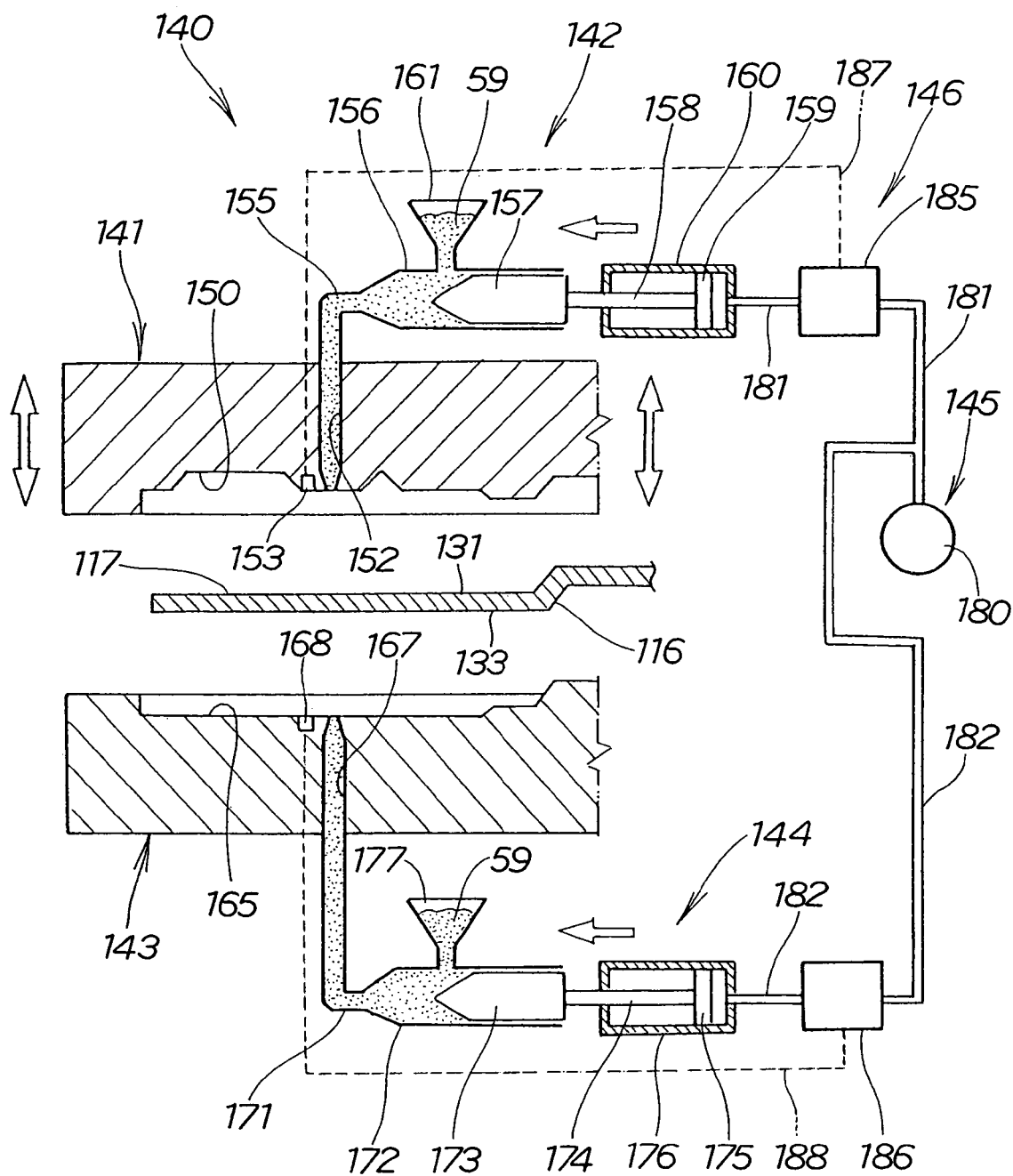
FIG. 10 is a sectional view showing an injection-molding apparatus according to the second embodiment of the invention.

As shown in FIG. 10, the injection-molding apparatus 140 has a first die 141 movable up and down as shown with arrows, has first injecting means 142 on this first die 141, has a second die 143 disposed below the first die 141 and clampable to the first die 141, has second injecting means 144 on this second die 143, has air supply means 145 for actuating the first and second injecting means 142 and 144, and has control means 146 able to control this air supply means 145 to a state in which it supplies air to the first and second injecting means 142, 144 and a state in which it does not.

The first die 141 has a front side cavity face 150 in its side facing the second die 143. By the first die 141 and the second die 143 being closed and a separator proper 116 being sandwiched with the first die 141 and the second die 143, a front side cavity 151 (see FIG. 11B) is formed by the front side cavity face 150 and the front face 131 of the separator proper 116.

Also, the first die 141 has a first gate 152 opening at the front face cavity face 150 and a first pressure sensor 153 for measuring the internal pressure of the front side cavity 151.

The first injecting means 142 is connected to the first gate 152. This injecting means 142 has a supply conduit 155 connecting with the first gate 152 and has an injection cylinder 156 connecting with this supply conduit 155; a plunger 157 is disposed movably inside the injection cylinder 156, a piston 159 is connected by a rod 158 to this plunger 157, and this piston 159 is disposed movably inside a cylinder 160.

The outlet of a hopper 161 connects with the injection cylinder 156, and a resin material in the hopper 161, for example molten silicone rubber (molding material) 59, is supplied into the injection cylinder 156.

After the molten silicone rubber 59 in the hopper 161 is supplied through the outlet into the injection cylinder 156, the piston 159 is moved in the direction of the arrow with the air supply means 145.

Figure 11A:
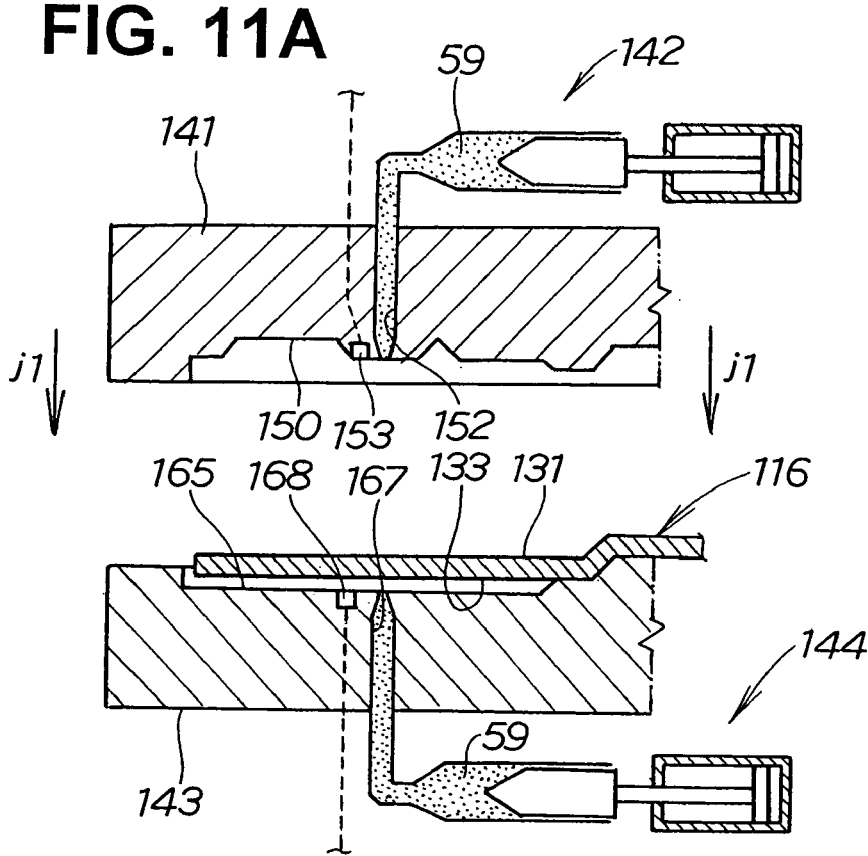
FIG. 11A and FIG. 11B are explanatory views showing an example of injecting molten silicone rubber into front and rear side cavities in an injection-molding method of the second embodiment.
Figure 11B:
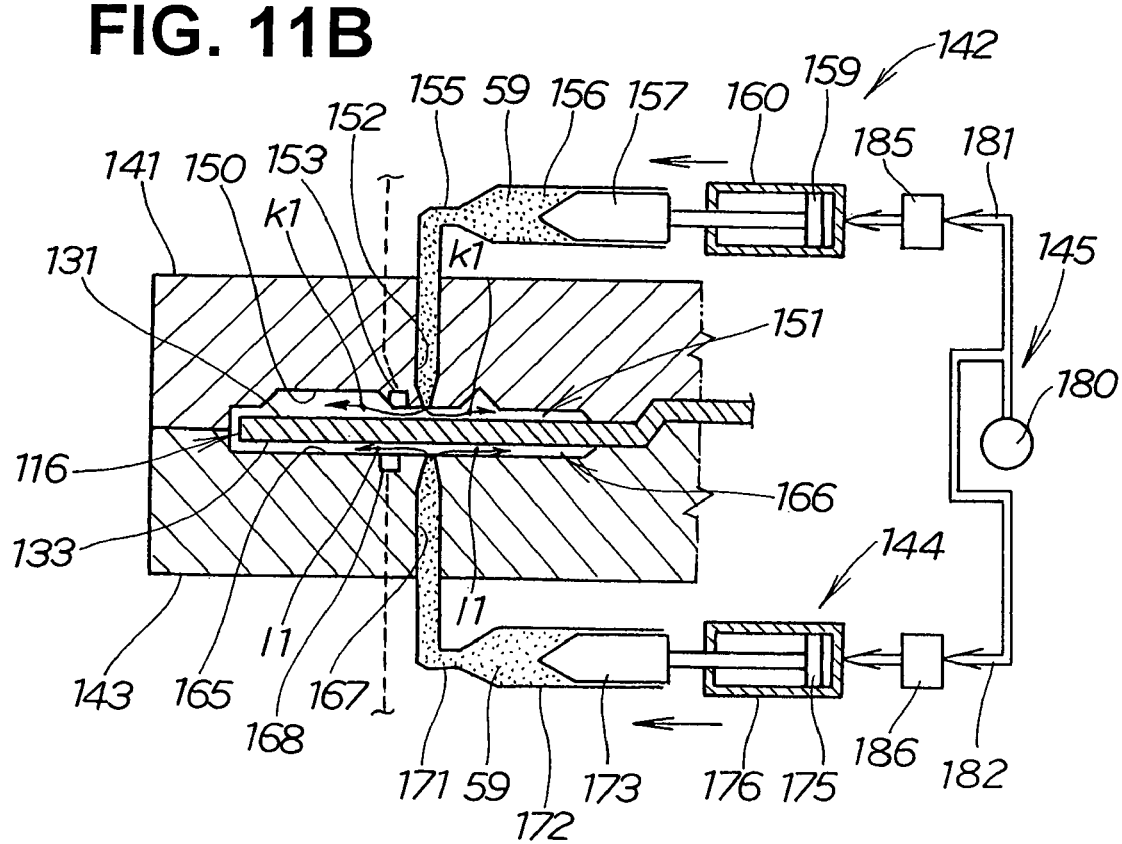

By the piston 159 being moved in the direction of the arrow, the plunger 157 is pushed out and injects silicone rubber 59 in the injection cylinder 156 through the first gate 152 into the front side cavity 151 (see FIG. 11B).

The second die 143 has a rear side cavity face 165 in its side facing the first die 141. By the first die 141 and the second die 143 being closed and the separator proper 116 being sandwiched by the first die 141 and the second die 143, a rear side cavity 166 (see FIG. 11B) is formed by the rear side cavity face 165 and the rear face 133 of the separator proper 116.

Also, the second die 143 has a second gate 167 opening at the rear face cavity face 165 and a second pressure sensor 168 for measuring the internal pressure of the rear side cavity 166.

The second injecting means 144 is connected to the second gate 167. This second injecting means 144, like the first injecting means 142, has a supply conduit 171 connecting with the second gate 167 and has an injection cylinder 172 connecting with this supply conduit 171; a plunger 173 is movably disposed inside the injection cylinder 172, a piston 175 is connected by a rod 174 to this plunger 173, and this piston 175 is movably disposed inside a cylinder 176.

The outlet of a hopper 177 connects with the injection cylinder 172, and a resin material inside the hopper 177, for example molten silicone rubber (molding material) 59, is supplied into the injection cylinder 172.

After molten silicone rubber 59 in the hopper 177 is supplied through the outlet into the injection cylinder 172, the piston 175 is moved in the direction of the arrow with the air supply means 145.

By the piston 175 being moved in the direction of the arrow, the plunger 173 is pushed out and injects silicone rubber 59 inside the injection cylinder 172 through the second gate 167 into the rear side cavity 166 (see FIG. 11B).

The air supply means 145 is made by connecting an air supply source 180 to the cylinder 160 of the first injecting means 142 by a first air flow passage 181 and connecting the air supply source 180 to the cylinder 176 of the second injecting means 144 by a second air flow passage 182.

The control means 146 has a first control part 185 in the first air flow passage 181, the first pressure sensor 153 being electrically connected to this first control part 185 by a harness 187, and has a second control part 186 in the second air flow passage 182, the second pressure sensor 168 being electrically connected to this second control part 186 by a harness 188.

The first pressure sensor 153 detects the internal pressure of the front side cavity 151 (see FIG. 11B) and sends an internal pressure detection signal to the first control part 185.

In a normal state the first control part 185 keeps the first air flow passage 181 open, but on the basis of the detection signal from the first pressure sensor 153 it switches the first air flow passage 181 to closed or regulates the aperture of the first air flow passage 181.

Accordingly, in the normal state, when the air supply source 180 is driven, air delivered from the air supply source 180 is supplied through the first half of the first air flow passage 181, the first control part 185 and the second half of the first air flow passage 181 to the cylinder 160 of the first injecting means 42.

As a result, the piston 159 is moved in the direction of the arrow and pushes out the plunger 157, and silicone rubber 59 inside the injection cylinder 156 is injected through the first gate 152 into the front side cavity 151 (see FIG. 11B).

The second pressure sensor 168 detects the internal pressure of the rear side cavity 166 (see FIG. 11B) and sends a detection signal to the second control part 186.

In the normal state the second control part 186 keeps the second air flow passage 182 open, but on the basis of the detection signal from the second pressure sensor 168 it switches the second air flow passage 182 to closed or regulates the aperture of the second air flow passage 182.

Accordingly, when the air supply source 180 is driven in the normal state, air delivered from the air supply source 180 is supplied through the first half of the second air flow passage 182, the second control part 186 and the second half of the second air flow passage 182 to the cylinder 176 of the second injecting means 144.

Consequently, the piston 175 is moved in the direction of the arrow and pushes out the plunger 173, and silicone rubber 59 inside the injection cylinder 172 is injected through the second gate 167 into the rear side cavity 166 (see FIG. 11B).

Next, an injection-molding method for molding the seal 118 (see FIG. 9) to the peripheral part 117 of the separator proper 116 using the injection-molding apparatus 140 will be described, on the basis of FIG. 10 through FIG. 12.

First, the injection-molding apparatus 140 shown in FIG. 10, i.e. a first die 141 having a front side cavity face 150 that will cover the front face 131 of a separator proper 116, a first gate 152 opening at the front side cavity face 150, and a first pressure sensor 153 for detecting the internal pressure of a front side cavity 151 (see FIG. 11B), and a second die 143 having a rear side cavity face 165 that will cover the rear face 133 of the separator proper 116, a second gate 167 opening at the rear side cavity face 165 and a second pressure sensor 168 for detecting the internal pressure of the rear side cavity 166, is prepared.

FIG. 11A and FIG. 11B are explanatory views showing an example of injecting molten silicone rubber into the front and rear side cavities in an injection-molding method of the second embodiment.

In FIG. 11A, a separator proper 116 is placed on the rear side cavity face 165 of the second die 143 and the first die 141 is lowered as shown by the arrows j1 to close the first and second dies 141, 143.

In FIG. 11B, as a result of the separator proper 116 being sandwiched by the first die 141 and the second die 143, a front side cavity 151 is formed by the front face 131 of the separator proper 116 and the front side cavity face 150 of the first die 141, and a rear side cavity 166 is formed by the rear face 133 of the separator proper 116 and the rear side cavity face 165 of the second die 143.

Then, by the air supply source 180 of the air supply means 145 being driven, air delivered from the air supply source 180 is supplied to the cylinder 160 of the first injecting means 142. The piston 159 moves as shown with an arrow, and the plunger 157 moves as shown by the arrow integrally with the piston 159.

Consequently, molten silicone rubber 59 inside the injection cylinder 156 is injected through the supply conduit 155 and the first gate 152 to the front side cavity 151 as shown by the arrows k1.

At this time, the internal pressure of the front side cavity 151 is detected by the first pressure sensor 153.

Simultaneously, air delivered from the air supply source 180 is supplied to the cylinder 176 of the second injecting means 144. The piston 175 moves as shown with an arrow, and the plunger 173 moves as shown by the arrow integrally with the piston 175.

Consequently, molten silicone rubber 59 inside the injection cylinder 172 is injected through the supply conduit 171 and the second gate 167 to the rear side cavity 166 as shown by the arrows l1 (l is a lower-case L).

At this time, the internal pressure of the rear side cavity 166 is detected by the second pressure sensor 168.

By the internal pressures of the front and rear side cavities 151, 166 being detected by the first and second pressure sensors 153, 168 like this, the respective apertures of the first and second air flow passages 181, 182 are regulated by the first and second control parts 185, 186 so that the internal pressures of the front and rear side cavities 151, 166 are kept constant.

Accordingly, a fixed injection pressure is applied to the front face 131 and the rear face 133 of the separator proper 116, and deformation of the separator proper 116 under the injection pressure is prevented.

By this means, the front and rear side cavities 151, 166 are rapidly filled with silicone rubber 59 with a normal injection pressure.

Also, by the internal pressures of the front and rear side cavities 151, 166 being kept constant, the flows of silicone rubber 59 are controlled so that there is no difference in internal pressure between the front and rear side cavities 151, 166 as injection of the silicone rubber 59 is carried out.

By any internal pressure difference between the front and rear side cavities 151, 166 being eliminated like this, the load acting on the separator proper 116 is reduced.

Figure 12A:
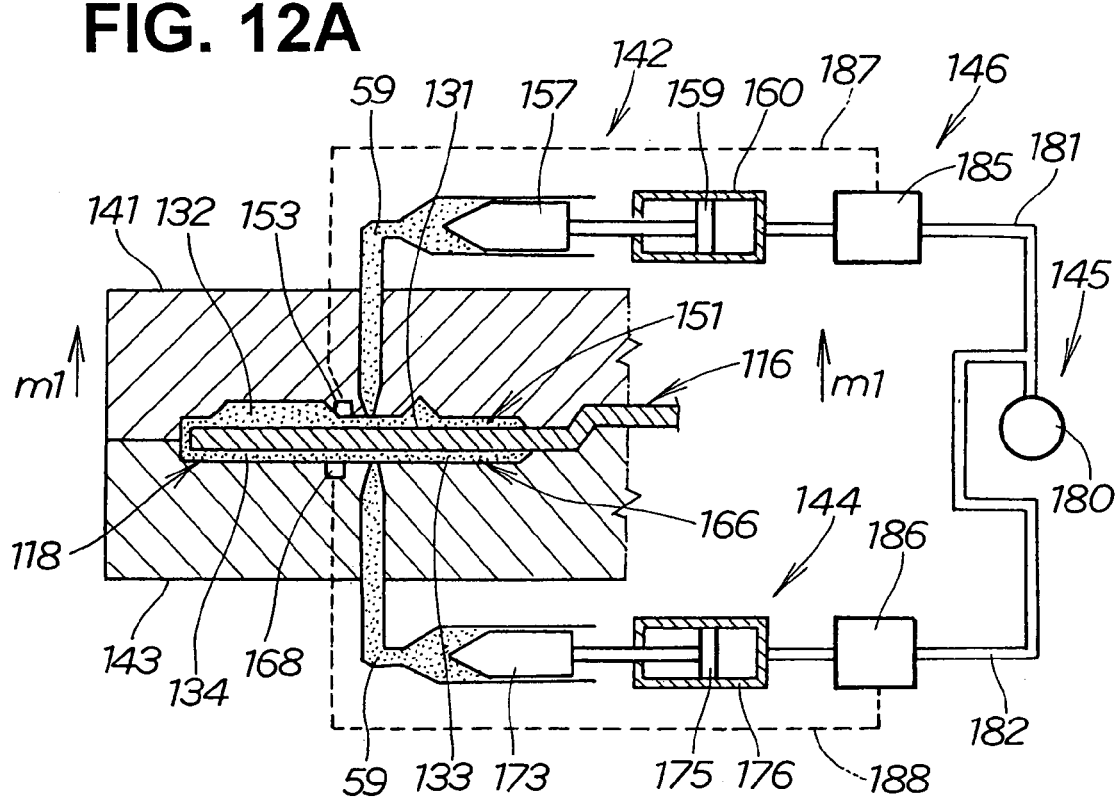
FIG. 12A and FIG. 12B are explanatory views showing an example of covering a separator proper with a seal in the injection-molding method of the second embodiment.
Figure 12B:
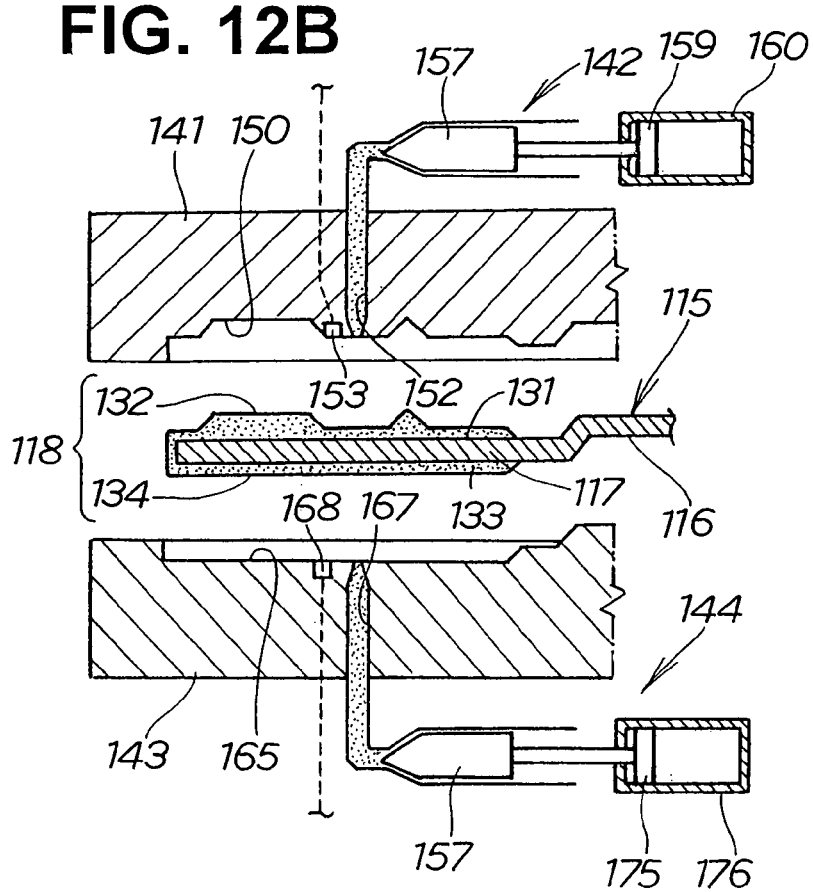

FIG. 12A and FIG. 12B are explanatory views showing an example of covering a separator proper with a seal in the injection-molding method of the second embodiment.

In FIG. 12A, when a prescribed amount of molten silicone rubber 59 has been injected into the front side cavity 151, the internal pressure of the front side cavity 151 reaches a prescribed value. At this time, the internal pressure having reached the prescribed value is detected by the first pressure sensor 153, and it sends this detection signal to the first control part 185 of the control means 145.

On the basis of this detection signal the first control part 185 operates and closes the first air flow passage 181 and thereby stops the air supply to the cylinder 160. Consequently the piston 159 and the plunger 157 stop and halt the injection of silicone rubber 59 into the front side cavity 151.

By this means, the front side cavity 151 is filled certainly with the prescribed amount of silicone rubber 59, and the front side molded layer 132 is molded optimally to the front face 131 of the separator proper 116.

Meanwhile, when a prescribed amount of molten silicone rubber 59 has been injected into the rear side cavity 166, the internal pressure of the rear side cavity 166 reaches a prescribed value. At this time, the internal pressure having reached the prescribed value is detected by the second pressure sensor 168, and this detection signal is sent to the second control part 186 of the control means 145.

On the basis of this detection signal the second control part 186 operates and closes the second air flow passage 182 and thereby stops the air supply to the cylinder 176. Consequently the piston 175 and the plunger 173 stop and halt the injection of silicone rubber 59 into the rear side cavity 166.

By this means, the rear side cavity 166 is filled certainly with the prescribed amount of silicone rubber 59, and the rear side molded layer 134 is molded optimally to the rear face 133 of the separator proper 116.

By the front side molded layer 132 being molded optimally to the front face 131 of the separator proper 116 and the rear side molded layer 134 being molded optimally to the rear face 133 of the separator proper 116 like this, a seal 118 is molded optimally with front and rear side molded layers 132, 134.

After the molding of the seal 118, the first die 141 is moved as shown by the arrows m1 to open the first and second dies 141, 143.

In FIG. 12B, by the first and second dies 141, 143 being opened, a separator 115 obtained by covering the peripheral part 117 of the separator proper 116 with the seal 118 is released from the first and second dies 141, 143.

This completes the process of manufacturing a separator 115.

As described in the second embodiment of FIG. 9 through FIG. 12B, with an injection-molding method according to this invention, molten silicone rubber 59 is injected into a front side cavity 151 through a first gate 152 and molten silicone rubber 59 is injected into a rear side cavity 166 through a second gate 167.

By silicone rubber 59 being injected into the front and rear side cavities 151, 166 separately through first and second gates 152, 167 like this, the silicone rubber 59 can be guided into the front and rear side cavities 151, 166 efficiently and the front and rear side cavities 151, 166 can be filled rapidly.

Also, by the internal pressures of the front and rear side cavities 151, 166 being detected with first and second pressure sensors 153, 168, the internal pressures of the front and rear side cavities 151, 166 are kept constant.

By this means, the silicone rubber 59 can be injected into each of the front side cavity 151 and the rear side cavity 166 optimally.

As a result, the front side molded layer 132 and the rear side molded layer 134 can be molded respectively to the front face 131 and the rear face 133 of the separator proper 116 well in a short time.

Next, an injection-molding apparatus 200 (see FIG. 13) for molding a seal 118 (see FIG. 9) will be described.

THIRD EMBODIMENT

Figure 13:
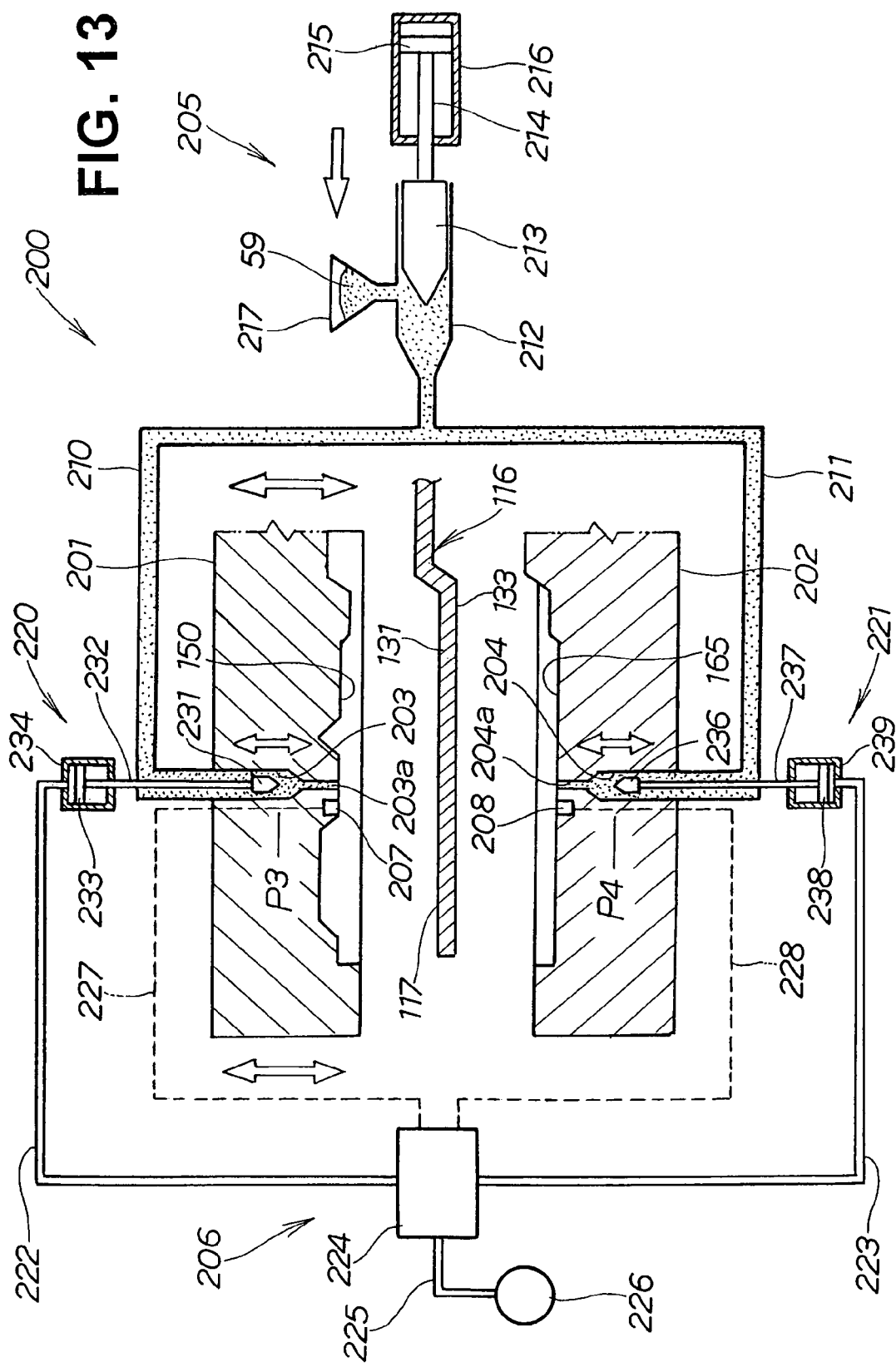
FIG. 13 is a sectional view showing an injection-molding apparatus according to a third embodiment of the invention.

As shown in FIG. 13, the injection-molding apparatus 200 has a first die 201 movable up and down as shown with arrows, has a second die 202 disposed below this first die 201 and clampable to the first die 201, has injecting means 205 connected to a first gate 203 in the first die 201 and a second gate 204 in the second die 202, and has control means 206 for opening and closing the first and second gates 203, 204.

The first die 201 has a front side cavity face 150 in its side facing the second die 202. When the first die 201 and the second die 202 are clamped together and a separator proper 116 is sandwiched between the first die 201 and the second die 202, a front side cavity 151 (see FIG. 14B) is formed by the front side cavity face 150 and the front face 131 of the separator proper 116.

Also, the first die 201 has the first gate 203, which opens at the front face cavity face 150, and a first pressure sensor 207 for measuring the internal pressure of the front side cavity 151.

The second die 202 has a rear side cavity face 165 in its side facing the first die 201. When the first die 201 and the second die 202 are clamped together and the separator proper 116 is sandwiched between the first die 201 and the second die 202, a rear side cavity 166 (see FIG. 14B) is formed by the rear side cavity face 165 and the rear face 133 of the separator proper 116.

Also, the second die 202 has the second gate 204, which opens at the rear face cavity face 165, and a second pressure sensor 208 for measuring the internal pressure of the rear side cavity 166.

The injecting means 205 is connected to the first and second gates 203, 204. This injecting means 205 has a first supply conduit 210 connecting with the first gate 203, has a second supply conduit 211 connecting with the second gate 204, and has an injection cylinder 212 connecting with the first and second supply conduits 210, 211; a plunger 213 is movably disposed inside the injection cylinder 212, a piston 215 is connected by a rod 214 to this plunger 213, and this piston 215 is movably disposed inside a cylinder 216.

The outlet of a hopper 217 connects with the injection cylinder 212, and a resin material inside the hopper 217, i.e. molten silicone rubber (molding material) 59, is supplied into the injection cylinder 212.

After molten silicone rubber 59 inside the hopper 161 has been supplied into the injection cylinder 212, by the piston 215 being moved in the direction of the arrow the plunger 213 is pushed out.

Figure 14A:
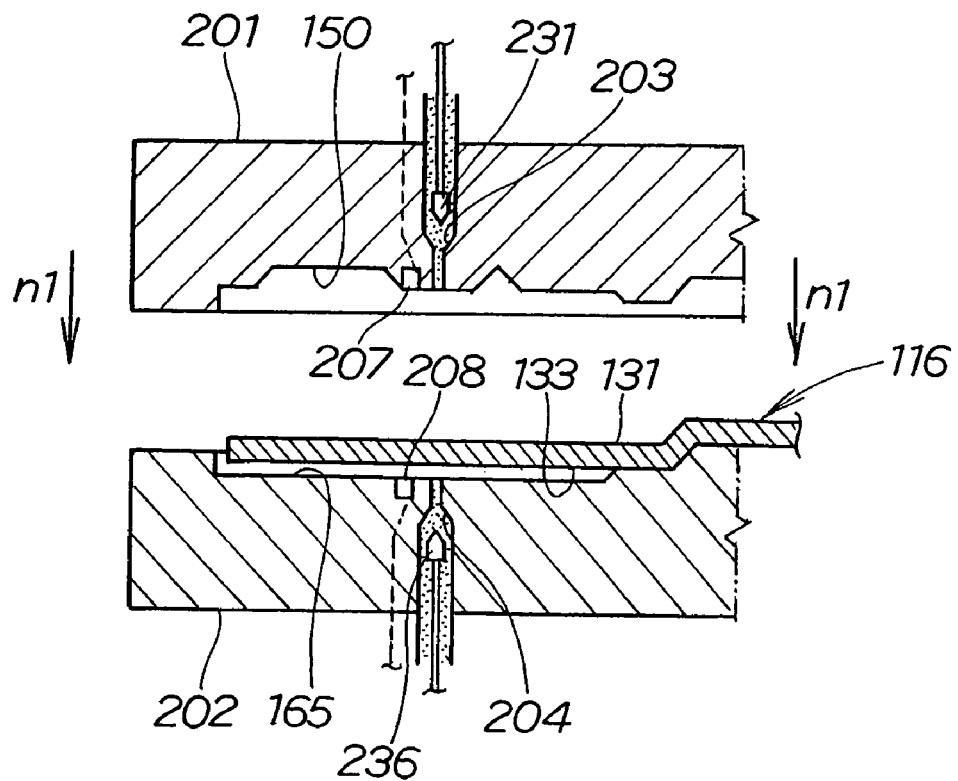
FIG. 14A and FIG. 14B are explanatory views showing an example of forming front and rear side cavities in an injection-molding method of the third embodiment.
Figure 14B:
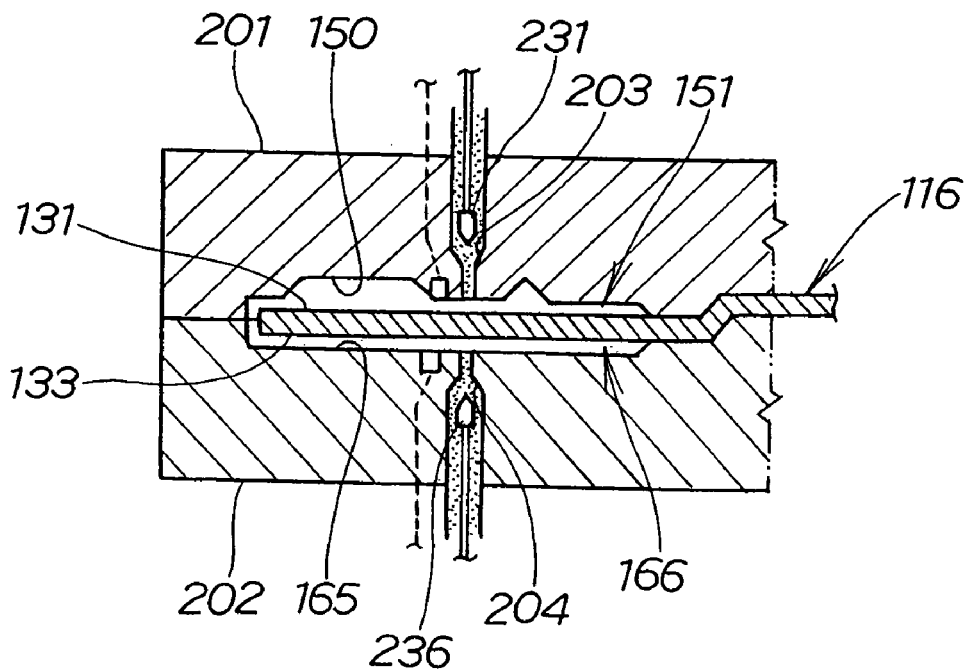

Consequently, silicone rubber 59 inside the injection cylinder 212 is injected through the first gate 203 into the front side cavity 151 (see FIG. 14B), and is injected through the second gate 204 into the rear side cavity 166 (see FIG. 14B).

The control means 206 has a first opening and closing part 220 for opening and closing the first gate 203 and has a second opening and closing part 221 for opening and closing the second gate 204; a control part 224 is connected to the first and second opening and closing parts 220, 221 by first and second air flow passages 222, 223 respectively, an air supply source 226 is connected to this control part 224 by an air supply passage 225, and the first and second pressure sensors 207, 208 are electrically connected to the control part 224 by harnesses 227, 228.

The first opening and closing part 220 has a first opening/closing valve 231 disposed raise/lowerably as shown with an arrow inside the first gate 203; a rod 232 extends upward from the first opening/closing valve 231, a piston 233 is attached to the upper end of the rod 232, and the piston 233 is received slidably inside a cylinder 234.

The second opening and closing part 221 has a second opening/closing valve 236 disposed raise/lowerably as shown with an arrow inside the second gate 204; a rod 237 extends upward from the second opening/closing valve 236, a piston 238 is attached to the upper end of the rod 237, and the piston 238 is slidably received inside a cylinder 239.

The first pressure sensor 207 detects the internal pressure of the front side cavity 151 (see FIG. 14B) and sends a detection signal to the control part 224.

The second pressure sensor 208 detects the internal pressure of the rear side cavity 166 (see FIG. 14B) and sends a detection signal to the control part 224.

The control part 224, in a normal state, by keeping the air supply passage 225 and the first air flow passage 222 in a disconnected state, sets the first opening/closing valve 231 to a standby position P3 and opens the first gate 203, and, by keeping the air supply passage 225 and the second air flow passage 223 in a disconnected state, sets the second opening/closing valve 236 to a standby position P4 and opens the second gate 204.

The control part 224, by switching the air supply passage 225 and the first air flow passage 222 to a connected state on the basis of a detection signal from the first pressure sensor 207, guides air from the air supply source 226 to the cylinder 234 and thereby actuates the piston 233 to lower the first opening/closing valve 231 from its standby position P3 and close the first gate 203.

Also, the control part 224, by switching the air supply passage 225 and the second air flow passage 223 to a connected state on the basis of a detection signal from the second pressure sensor 208, guides air from the air supply source 226 to the cylinder 239 and thereby actuates the piston 238 to raise the second opening/closing valve 236 from its standby position P4 and close the second gate 204.

Additionally, on the basis of the detection signals from the first and second pressure sensors 207, 208, the control part 224 regulates the apertures of the first and second gates 203, 204 with the first and second opening/closing valves 231, 236 so that the internal pressures of the front side cavity 151 and the rear side cavity 166 (see FIG. 14B) are constant.

Next, an injection-molding method for molding a seal 118 on the peripheral part 117 of a separator proper 116 using the injection-molding apparatus 200 will be described, on the basis of FIG. 13 through FIG. 17.

First, the injection-molding apparatus 200 shown in FIG. 13, i.e. a first die 201 having a front side cavity face 150 that will cover the front face 131 of a separator proper 116, a first gate 203 opening at the front side cavity face 150, and a first pressure sensor 207 for detecting the internal pressure of the front side cavity 151 (see FIG. 14B), and a second die 202 having a rear side cavity face 165 that will cover the rear face 133 of the separator proper 116, a second gate 204 opening at the rear side cavity face 165, and a second pressure sensor 208 for detecting the internal pressure of the rear side cavity 166 (see FIG. 14B), is prepared.

FIG. 14A and FIG. 14B are explanatory views showing an example of forming front and rear side cavities in an injection-molding method of a third embodiment.

In FIG. 14A, a separator proper 116 is placed on the rear side cavity face 165 of the second die 202, and by the first die 201 being lowered as shown by the arrows n1 the first and second dies 201, 202 are closed.

In FIG. 14B, by the separator proper 116 being sandwiched by the first die 201 and the second die 202, a front side cavity 151 is formed by the front face 131 of the separator proper 116 and the front side cavity face 150 of the first die 201, and a rear side cavity 166 is formed by the rear face 133 of the separator proper 116 and the rear side cavity face 165 of the second die 202.

Figure 15:
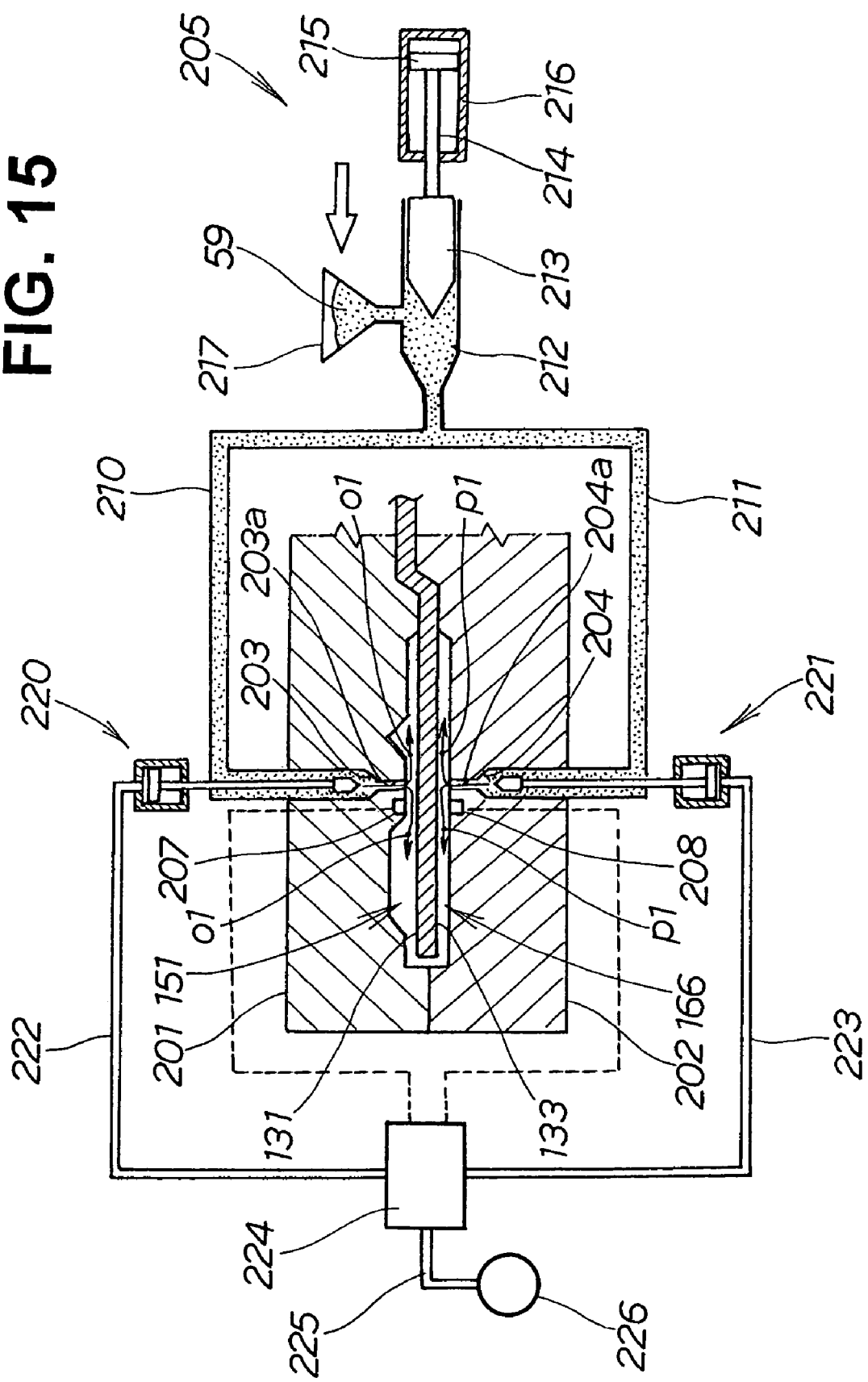
FIG. 15 is an explanatory view showing an example of injecting molten silicone rubber into front and rear side cavities in the injection-molding method of the third embodiment.

FIG. 15 is an explanatory view showing an example of injecting molten silicone rubber into the front and rear side cavities in the injection-molding method of the third embodiment.

Next, the piston 215 of the injecting means 205 is moved as shown with an arrow and together with the piston 215 the plunger 213 moves as shown by the arrow.

Consequently, molten silicone rubber 59 inside the injection cylinder 212 is passed through the first supply conduit 210, the first gate 203 and a tip flow passage 203a of the first gate 203 and injected into the front side cavity 151 as shown by the arrows o1.

While this is happening, the internal pressure of the front side cavity 151 is detected with the first pressure sensor 207.

At the same time, molten silicone rubber 59 inside the injection cylinder 212 is passed through the second supply conduit 211, the second gate 204 and a tip flow passage 204a of the second gate 204 and injected into the rear side cavity 166 as shown by the arrows p1.

While this is happening, the internal pressure of the rear side cavity 166 is detected with the second pressure sensor 208.

By the internal pressures of the front and rear side cavities 151, 166 being detected by the first and second pressure sensors 207, 208 like this, the apertures of the first and second gates 203, 204 are regulated by the control part 224 so that the internal pressures of the front and rear side cavities 151, 166 are kept constant.

Therefore, a constant injection pressure is applied to the front face 131 and the rear face 133 of the separator proper 116, and deformation of the separator proper 116 under injection pressure is prevented. By this means it is possible to inject silicone rubber 59 into the front and rear side cavities 151, 166 rapidly with a normal injection pressure.

Also, by the internal pressures of the front and rear side cavities 151, 166 being kept constant, the flows of silicone rubber 59 are controlled so that there is no difference in internal pressure between the front and rear side cavities 151, 166 as injection of the silicone rubber 59 is carried out.

By any internal pressure difference between the front and rear side cavities 151, 166 being eliminated like this, the load acting on the separator proper 116 can be reduced.

Figure 16:
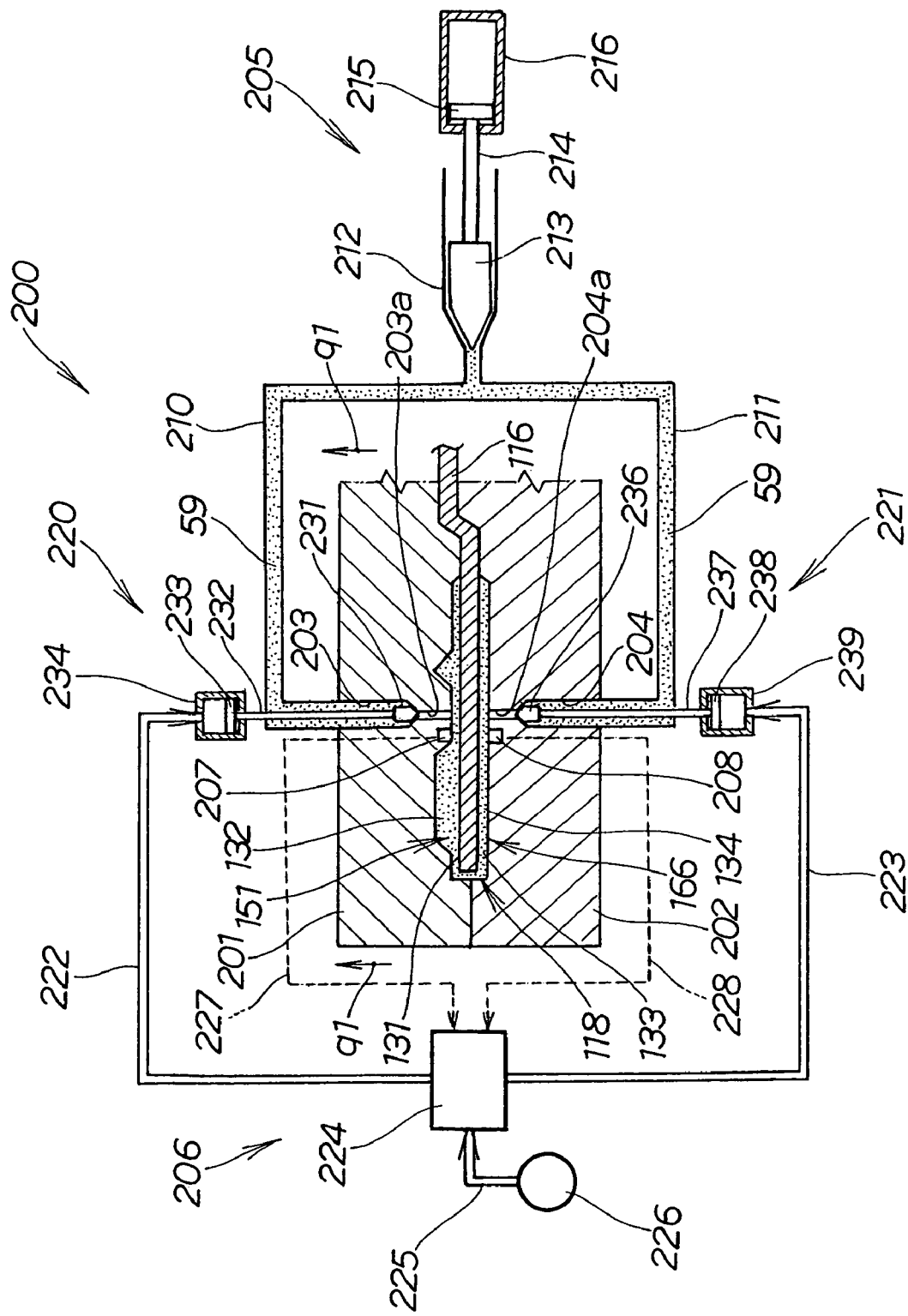
FIG. 16 is an explanatory view showing an example of molding a seal in the injection-molding method of the third embodiment.

FIG. 16 is an explanatory view showing an example of molding a seal in the injection-molding method of the third embodiment.

When a prescribed amount of molten silicone rubber 59 has been injected into the front side cavity 151, the internal pressure of the front side cavity 151 reaches a prescribed value. At this time, the internal pressure having reached the prescribed value is detected with the first pressure sensor 207, and this detection signal is sent to the control part 224 of the control means 206.

On the basis of this detection signal the control part 224 operates, and switches the air supply passage 225 and the first air flow passage 222 to a connected state. Air from the air supply source 226 is guided via the air supply passage 225 and the first air flow passage 222 to the cylinder 234 and actuates the piston 233.

The rod 232 is actuated together with the piston 233 and lowers the first opening/closing valve 231 from its standby position P3 (see FIG. 13) and closes the first gate 203 with the first opening/closing valve 231.

By this means, the front side cavity 151 is filled certainly with the prescribed amount of silicone rubber 59, and the front side molded layer 132 is molded optimally to the front face 131 of the separator proper 116.

Meanwhile, a prescribed amount of molten silicone rubber 59 is injected into the rear side cavity 166 and the internal pressure of the rear side cavity 166 reaches a prescribed value. At this time, the internal pressure having reached the prescribed value is detected by the second pressure sensor 208, and this detection signal is sent to the control part 224 of the control means 206.

On the basis of this detection signal the control part 224 operates and switches the air supply passage 225 and the second air flow passage 223 to a connected state. Air from the air supply source 226 is guided via the air supply passage 225 and the second air flow passage 223 to the cylinder 239 and actuates the piston 238.

The rod 237 is actuated together with the piston 238 and raises the second opening/closing valve 236 to the standby position P4 (see FIG. 13) and closes the second gate 204 with the second opening/closing valve 236.

By this means, the rear side cavity 166 is filled certainly with the prescribed amount of silicone rubber 59, and the rear side molded layer 134 is molded optimally to the rear face 133 of the separator proper 116.

By the front side molded layer 132 being molded optimally to the front face 131 of the separator proper 116 and the rear side molded layer 134 being molded optimally to the rear face 133 of the separator proper 116 like this, the seal 118 is molded optimally with front and rear side molded layers 132, 134.

After the molding of the seal 118, the first die 201 is moved as shown by the arrows q1 and the first and second dies 201, 202 are opened.

Figure 17:
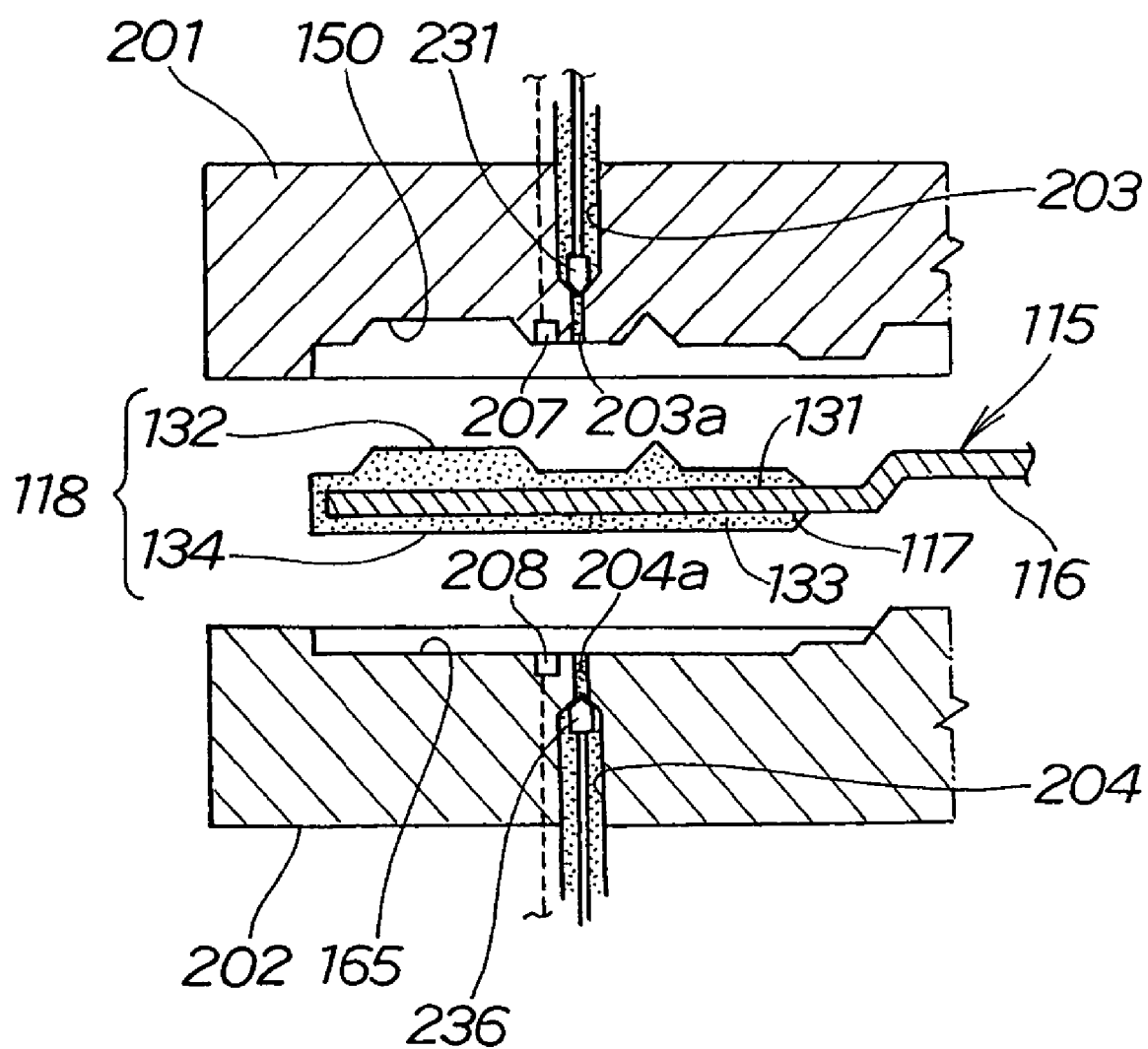
FIG. 17 is an explanatory view showing an example of releasing a separator from first and second dies in the injection-molding method of the third embodiment.

FIG. 17 is an explanatory view showing an example of releasing a separator from the first and second dies in the injection-molding method of the third embodiment.

As a result of the first and second dies 201, 202 being opened, a separator 115 obtained by covering the peripheral part 117 of a separator proper 116 with a seal 118 is released from the first and second dies 201, 202.

This completes the process of manufacturing a separator 15.

As described in the third embodiment of FIG. 13 through FIG. 17, with an injection-molding method according to this invention, molten silicone rubber 59 is injected into a front side cavity 151 through a first gate 203 and molten silicone rubber 59 is injected into a rear side cavity 166 through a second gate 204.

By molten silicone rubber 59 being injected into the front and rear side cavities 151, 166 separately through first and second gates 203, 204 like this, the silicone rubber 59 can be guided into the front and rear side cavities 151, 166 efficiently and the front and rear side cavities 151, 166 can be filled rapidly.

Also, by the internal pressures of the front and rear side cavities 151, 166 being detected with first and second pressure sensors 207, 208, the internal pressures of the front and rear side cavities 151, 166 are kept constant.

By this means, the silicone rubber 59 can be injected into each of the front side cavity 151 and the rear side cavity 166 optimally.

As a result, the front side molded layer 132 and the rear side molded layer 134 can be molded respectively to the front face 131 and the rear face 133 of the separator proper 116 well in a short time.

Next, an injection-molding apparatus 340 (see FIG. 18) for molding a seal 118 (see FIG. 9) will be described.

FOURTH EMBODIMENT

Figure 18:
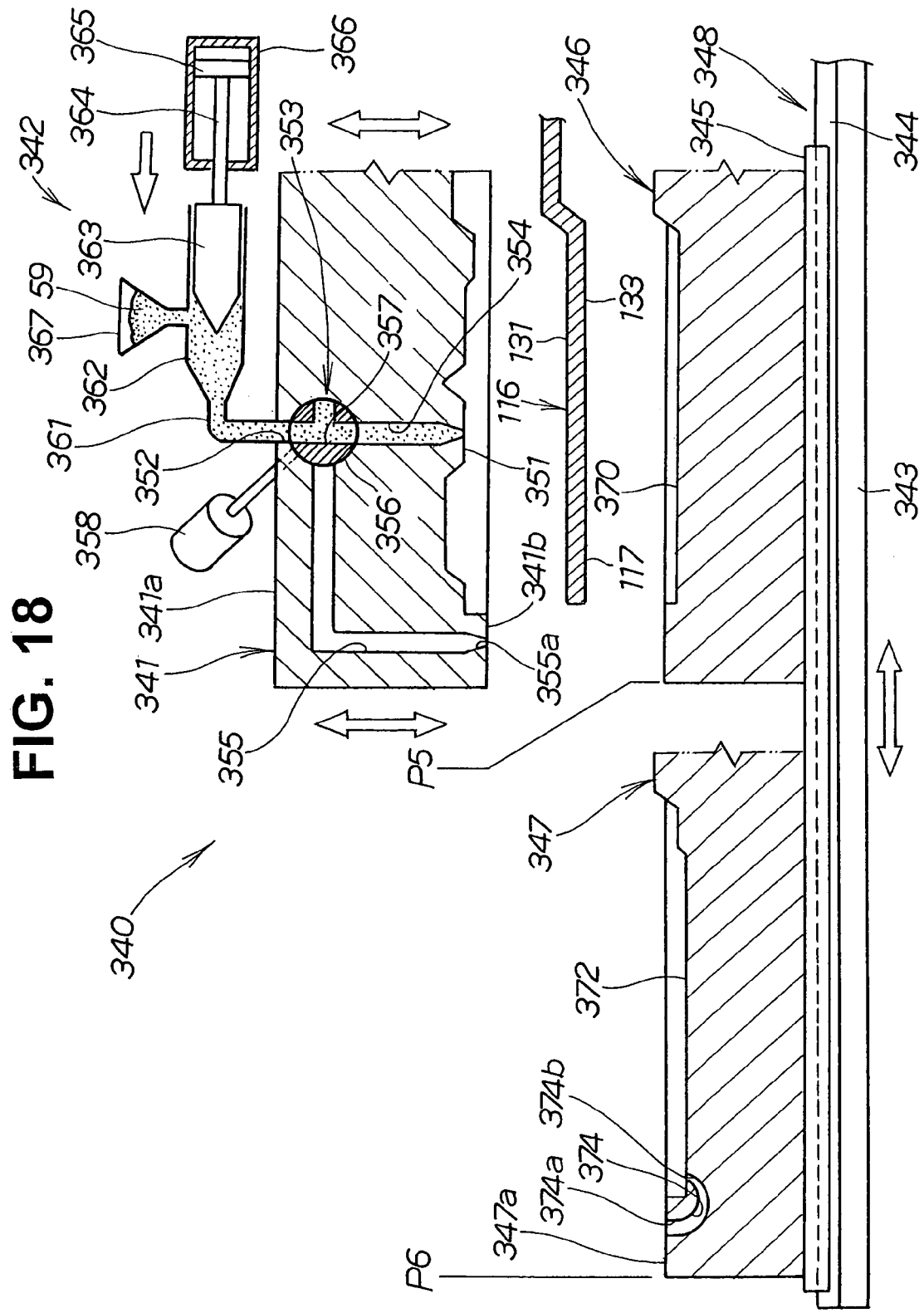
FIG. 18 is a sectional view showing an injection-molding apparatus according to a fourth embodiment of the invention.

As shown in FIG. 18, the injection-molding apparatus 340 is made up of a first die 341 provided raise/lowerably as shown with arrows, injecting means 342 provided on this first die 341, a bed 343 disposed below the first die 341, moving means 348 for sliding a slider 345 along a guide rail 344 of this bed 343, and second and third dies 346, 347 mounted on this slider 345.

The moving means 348 is made up of the guide rail 344 provided on the bed 343, the slider 345, which is mounted slidably in the arrow direction along the guide rail 344, and an actuator (not shown) such as a air cylinder for moving the slider 345 along the guide rail 344.

The first die 341 has a front side cavity face 351 for forming a front side cavity 350 (see FIG. 19B) with the front face 131 of a separator proper 116 when the first die 341 is clamped to the second die 346.

Also, the first die 341 is provided with a runner 352 opening at a top face 341a and has first and second gates 354, 355 connecting with this runner 352 via switching means (a switching valve) 353.

The first gate 354 is a flow passage having its outlet opening at the front side cavity face 351. On the other hand, the second gate 355 is a flow passage having its outlet 355a opening at a bottom face 341b of the first die 341, avoiding the front side cavity face 351.

A switching valve 353 is provided at a branching point of the first gate 354 and the second gate 355.

This switching valve 353 is a valve constructed for example so that it has a valve member 356 rotatably in the first die 341, a T-shaped flow passage 357 is formed in the valve member 356, and by this valve member 356 being rotated with an actuator such as a motor 358, the runner 352 can be connected to either one of the first and second gates 354, 355.

Accordingly, by controlling the valve member 356 of the switching valve 353 with the motor 358, it is possible to switch between a state in which the runner 352 is connected to the first gate 354 and molten silicone rubber (molding material) 59 is guided from the injecting means 342 to the first gate 354, and a state in which the runner 352 is connected to the second gate 355 and molten silicone rubber (molding material) 59 is guided from the injecting means 342 to the second gate 355.

The injecting means 342 has a supply conduit 361 connected to the runner 352 of the first die 341 and has an injection cylinder 362 connected to this supply conduit 361; a plunger 363 is movably disposed inside the injection cylinder 362, this plunger 363 is connected by a rod 364 to a piston 365, and this piston 365 is disposed movably inside a cylinder 366.

The outlet of a hopper 367 connects with the injection cylinder 362, and resin material, i.e. molten silicone rubber (molding material) 59, in the hopper 367 is supplied into the injection cylinder 362.

Figure 19A:
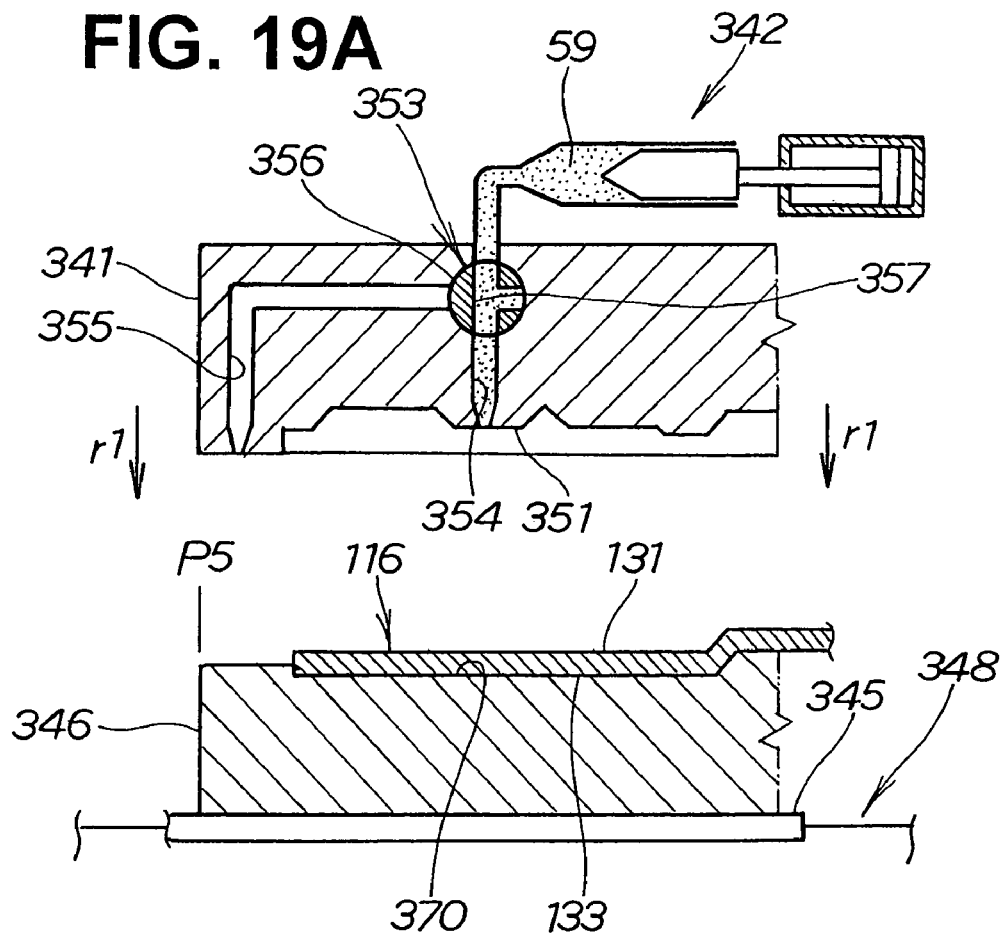
FIG. 19A and FIG. 19B are explanatory views showing an example of injecting molten silicone rubber into a front side cavity in an injection-molding method according to the fourth embodiment.
Figure 19B:
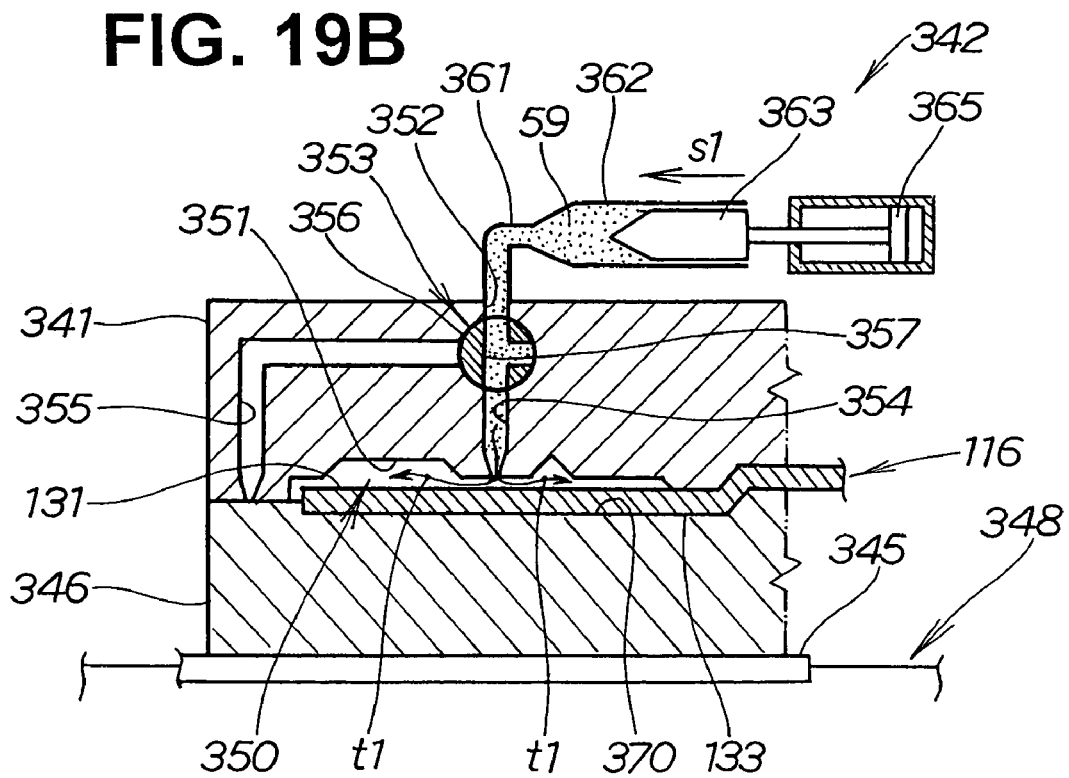

After molten silicone rubber 59 in the hopper 367 is supplied through the outlet into the injection cylinder 362, by the piston 365 being moved in the direction of the arrow, the plunger 363 is pushed out and silicone rubber 59 inside the injection cylinder 362 is injected through the runner 352, the flow passage 357 of the switching valve 353 and the first gate 354 into the front side cavity 350 (see FIG. 19B).

The second die 346 is mounted on the slider 345 and has at its top a receiving face 370 for making contact with the rear face 133 of the separator proper 116 when the second die 346 is clamped to the first die 341.

The third die 347 is mounted on the slider 345 and has a rear side cavity face 372 for forming a rear side cavity 371 (see FIG. 21B) with the rear face 133 of the separator proper 116 when the third die 347 is clamped to the first die 341, and has a connecting passage 374 for connecting the second gate 355 to the rear side cavity 371.

The connecting passage 374 is a substantially J-shaped flow passage having an inlet 374a opening in a top face 347a of the third die 347 and having an outlet 374b opening at the rear side cavity face 372, and when the first die 341 and the third die 347 are clamped together the outlet 355a of the second gate 355 faces the inlet 374a.

Accordingly, when the first die 341 and the third die 347 are clamped together, the rear side cavity 371 (see FIG. 21B) is connected to the second gate 355 by the connecting passage 374.

Figure 21A:
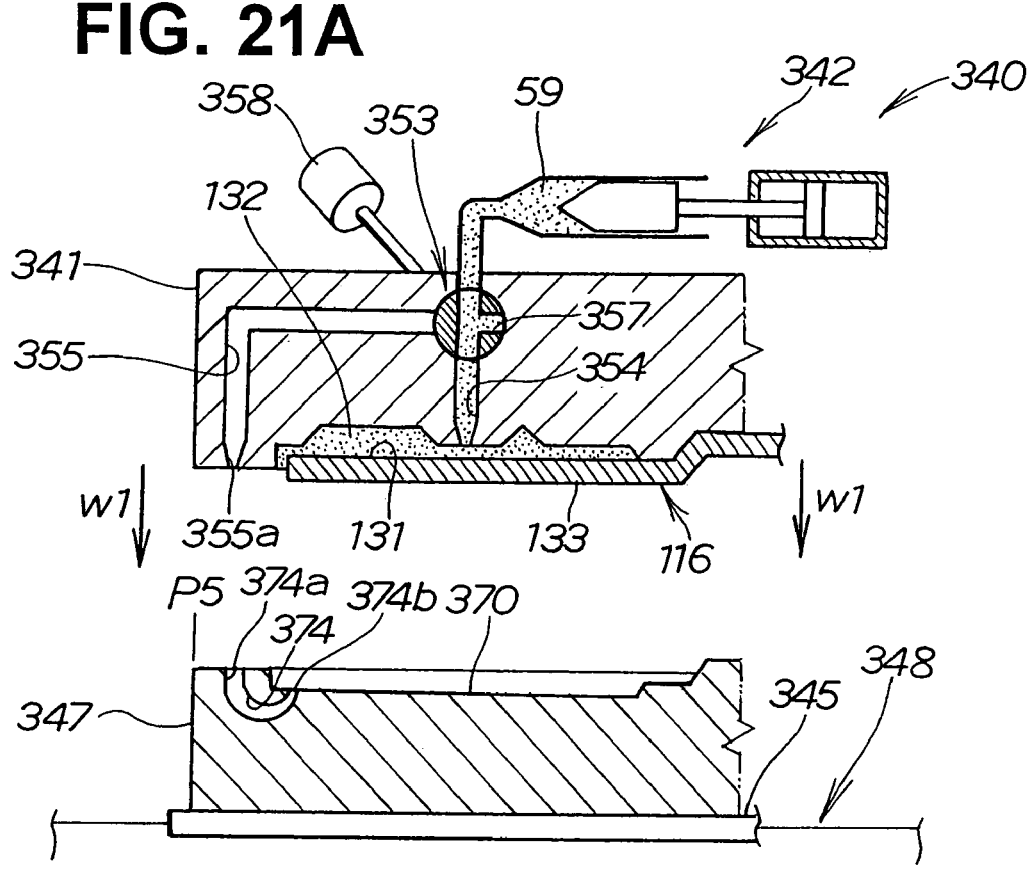
FIG. 21A and FIG. 21B are explanatory views showing an example of injecting molten silicone rubber into a rear side cavity in the injection-molding method of the fourth embodiment.
Figure 21B:
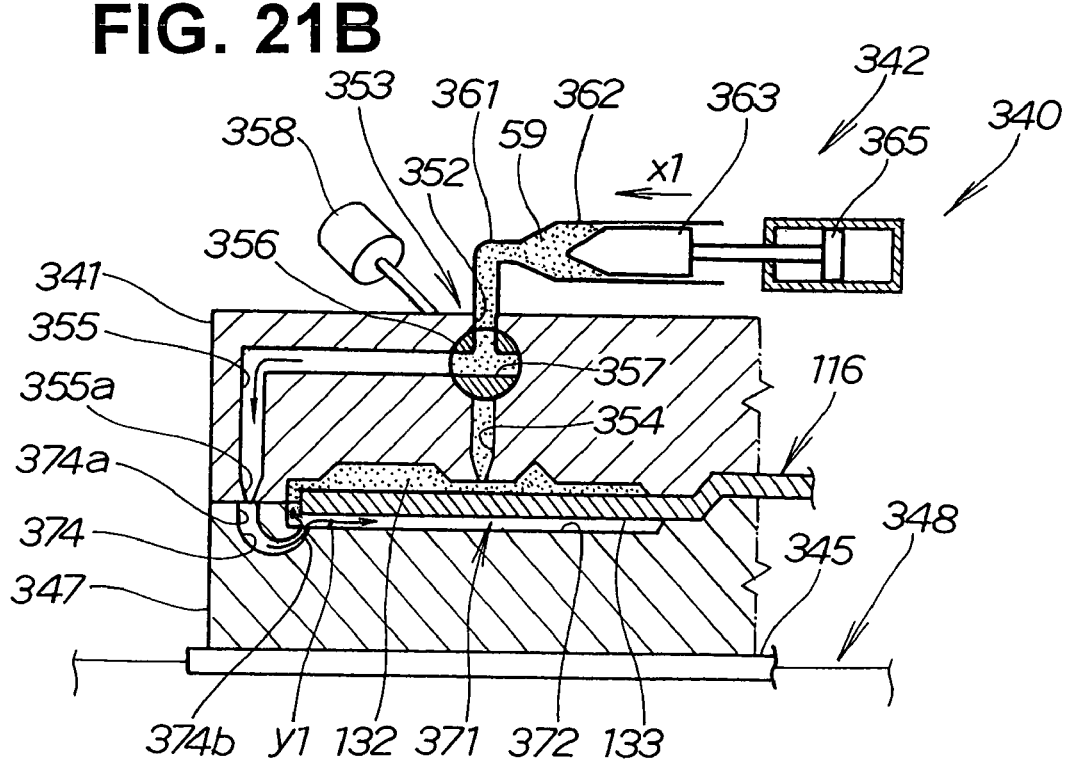

By this means, when the piston 365 of the injecting means 342 is moved in the arrow direction the plunger 363 is pushed out and silicone rubber 59 in the injection cylinder 362 is injected through the runner 352, the flow passage 357 of the switching valve 353, the second gate 355 and the connecting passage 374 into the rear side cavity 371 (see FIG. 21B).

The moving means 348 is means for moving the slider 345 in the arrow direction, and moves the second die 346 and the third die 347 between a facing position P5 facing the first die 341 and a withdrawn position P6 where the second die 346 and the third die 347 are withdrawn from the first die 341.

Next, an injection-molding method for molding a seal 118 (see FIG. 9) to the peripheral part 117 of a separator proper 116 using an injection-molding apparatus 340 will be described, on the basis of FIG. 18 through FIG. 22.

First, the injection-molding apparatus 340 shown in FIG. 18 is prepared. That is, a first die 341 having a front side cavity face 351 that will cover the front face 131 of a separator proper 116, a first gate 354 opening at the front side cavity face 351, a second gate 355 avoiding the front side cavity face 351, and a switching valve 353 for guiding molten silicone rubber 59 to either one of the first and second gates 354, 355 is prepared; a second die 346 having a receiving face 370 for receiving the rear face 133 of the separator proper 116 without forming a cavity is prepared; and a third die 347 having a rear side cavity face 372 that will cover the rear face 133 of the separator proper 116 and a connecting passage 374 for connecting the second gate 355 to the rear side cavity 371 (see FIG. 21B) is prepared.

FIG. 19A and FIG. 19B are explanatory views showing an example of injecting molten silicone rubber into a front side cavity in the injection-molding method of the fourth embodiment.

In FIG. 19A, by the slider 345 being moved with the moving means 348, the second die 346 is set to the facing position P5, and the second die 346 is thus made to face the first die 341.

Next, by a separator proper 116 being received onto the receiving face 370 of the second die 346, the rear face 133 of the separator proper 116 is brought into contact with the receiving face 370.

In this state, by the first die 341 being lowered as shown by the arrows r1, the first and second dies 341, 346 are closed.

In FIG. 19B, by the separator proper 116 being sandwiched between the first die 341 and the second die 346, a front side cavity 350 is formed by the front face 131 of the separator proper 116 and the front side cavity face 351 of the first die 341.

Then, the plunger 363 is moved as shown by the arrow s1 with the piston 365 of the injecting means 342. As a result of this, molten silicone rubber 59 in the injection cylinder 362 is injected through the supply conduit 361, the runner 352, the flow passage 357 of the switching valve 353 and the first gate 354 into the front side cavity 350 as shown by the arrows t1.

Figure 20A:
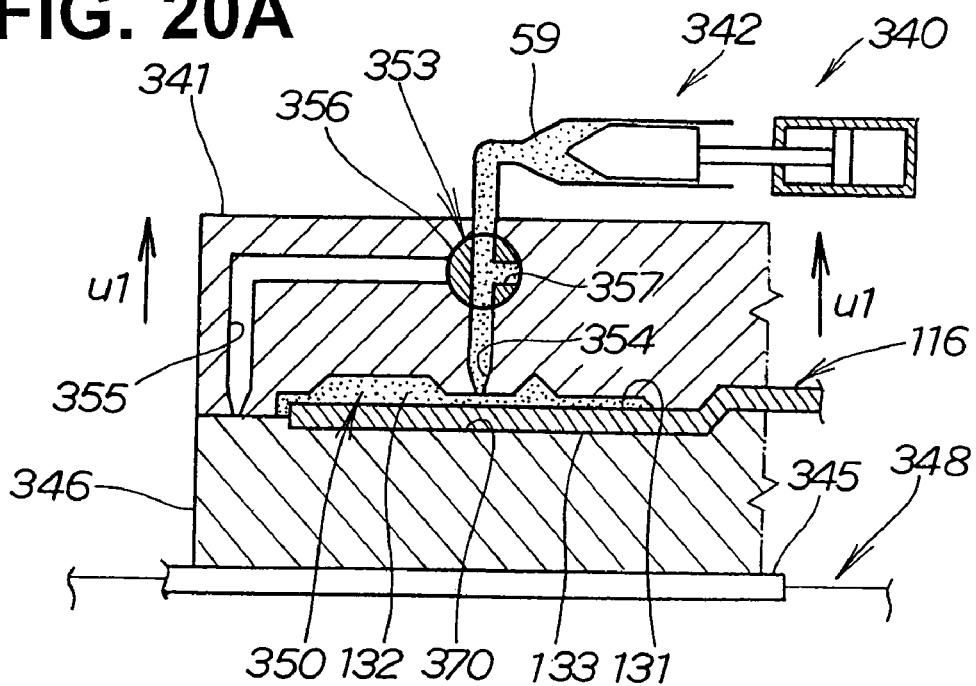
FIG. 20A and FIG. 20B are explanatory views showing an example of molding a front side molded layer to a separator proper in the injection-molding method of the fourth embodiment.
Figure 20B:
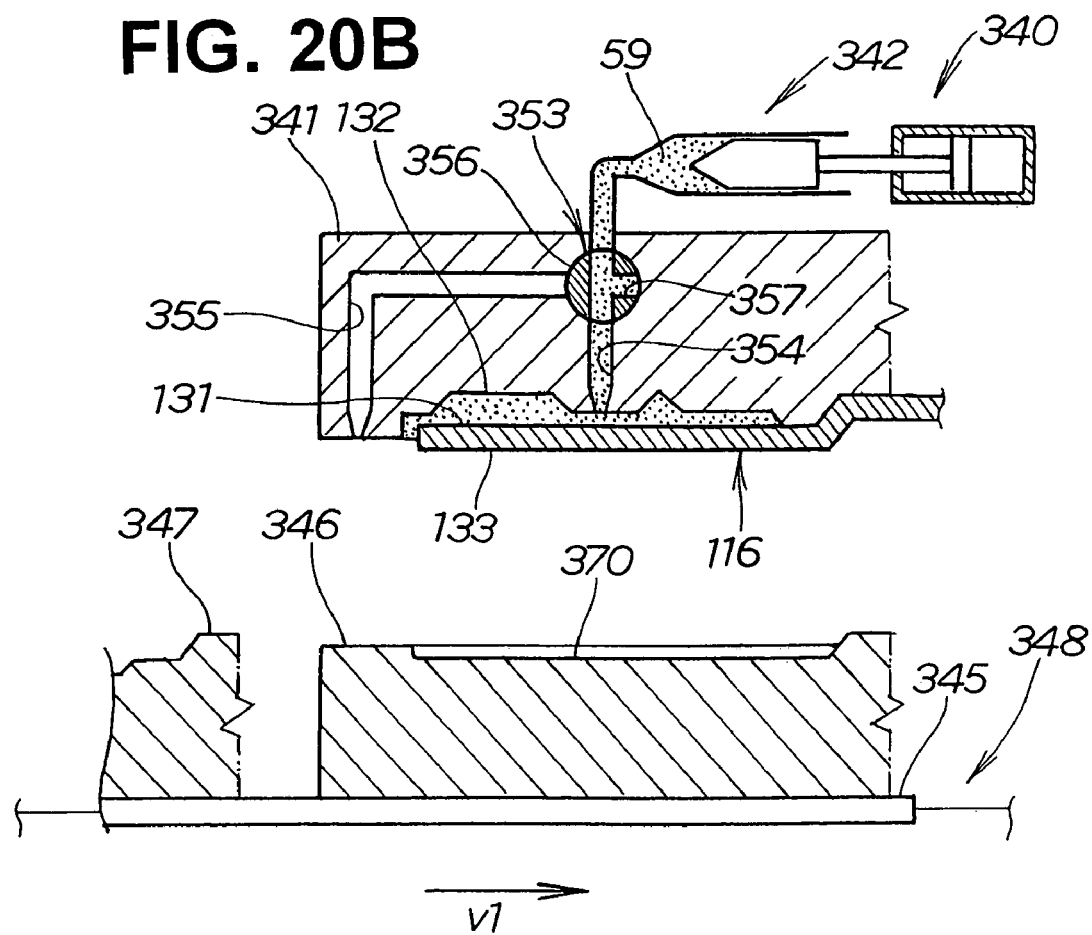

FIG. 20A and FIG. 20B are explanatory views showing an example of molding a front side molded layer to a separator proper in the injection-molding method of the fourth embodiment.

In FIG. 20A, by molten silicone rubber 59 being injected into the front side cavity 350, a front side molded layer 132 is molded to the front face 131 of the separator proper 116.

Next, the first die 341 is opened by being moved as shown by the arrows u1.

In FIG. 20B, when the first die 341 is opened, by the separator proper 116 moving together with the first die 341, the separator proper 116 is released from the second die 346.

Next, the moving means 348 is operated to move the slider 345 as shown by the arrow v1.

FIG. 21A and FIG. 21B are explanatory views showing an example of injecting molten silicone rubber into the rear side cavity in the injection-molding method of the fourth embodiment.

In FIG. 21A, the third die 347 is set to the facing position P5, and the third die 347 is thus made to face the first die 341.

Then, by the first die 341 being lowered as shown by the arrows w1, while the front side molded layer 132 is still soft the first and third dies 341, 347 are clamped together and the second die 346 (see FIG. 20B) is thus replaced with the third die 347.

In FIG. 21B, by the first die 341 and the third die 347 being clamped together sandwiching the separator proper 116, a rear side cavity 371 is formed by the rear face 133 of the separator proper 116 and the rear face cavity face 372 of the third die 347.

At this time, the outlet 355a of the second gate 355 is brought to face the inlet 374a and the second gate 355 is thereby connected to the rear side cavity 371 by the connecting passage 374.

Next, by the valve member 356 being turned counterclockwise through 90° with the motor 358 of the switching valve 353, the runner 352 is connected to the second gate 355 with the flow passage 357 of the valve member 356.

Then, by the plunger 363 being moved as shown by the arrow x1 with the piston 365 of the injecting means 342, molten silicone rubber 59 in the injection cylinder 362 is injected through the supply conduit 361, the runner 352, the flow passage 357 of the switching valve 353, the second gate 355 and the connecting passage 374 into the rear side cavity 371 as shown by the arrow y1.

By molten silicone rubber 59 guided to the second gate 355 being guided through the connecting passage 374 into the rear side cavity 371 like this, molten silicone rubber 59 can be injected into the rear side cavity 371 efficiently and rapidly.

Figure 22A:
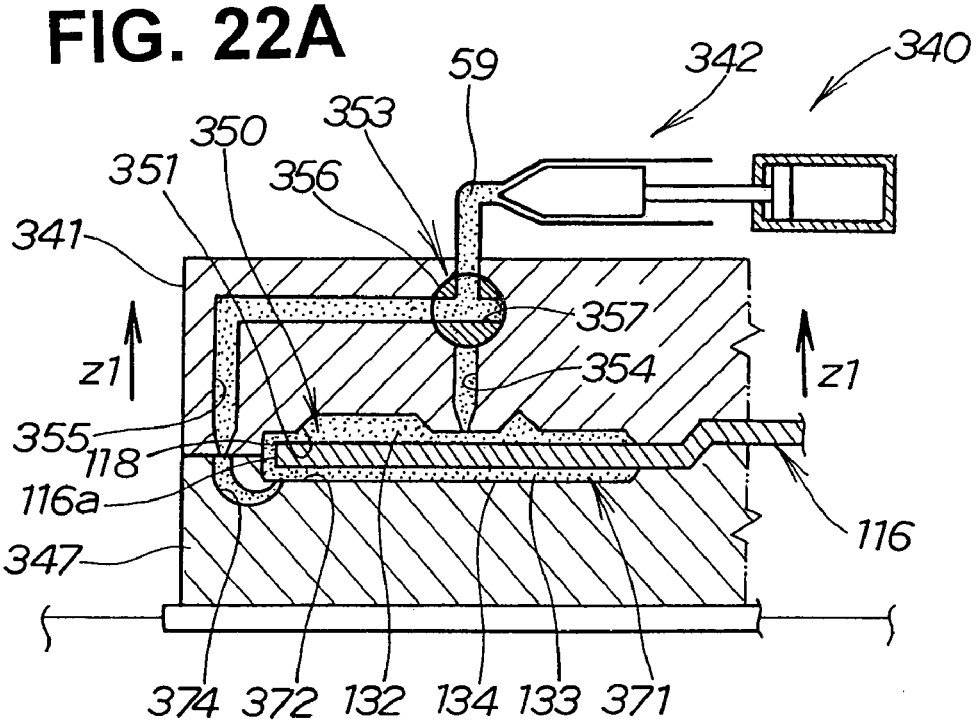
FIG. 22A and FIG. 22B are explanatory views showing an example of releasing a separator from first and third dies in the injection-molding method of the fourth embodiment.
Figure 22B:
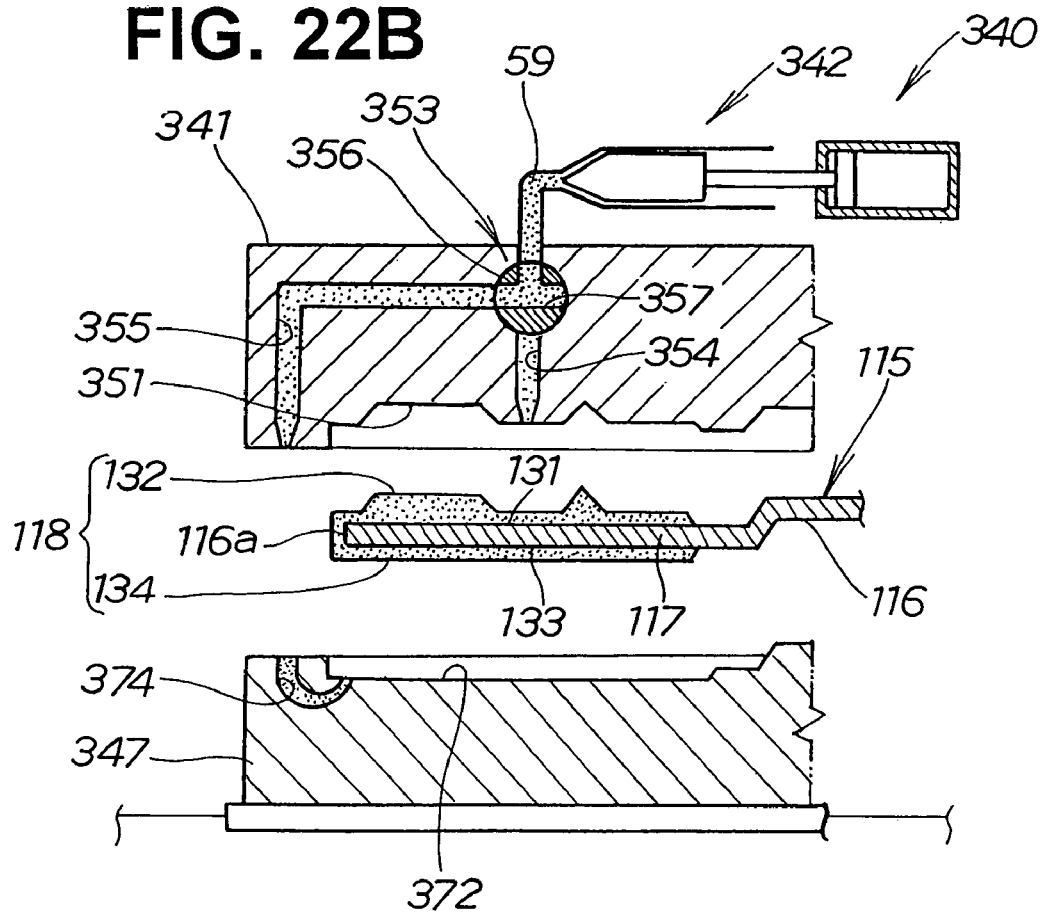

FIG. 22A and FIG. 22B are explanatory views showing an example of releasing the separator from the first and third dies in the injection-molding method of the fourth embodiment.

In FIG. 22A, molten silicone rubber 59 is injected into the rear side cavity 371 to mold a rear side molded layer 134 on the rear face 133 of the separator proper 116.

Here, the outer edge 116a of the separator proper 116 is disposed a predetermined gap away from the front side cavity face 351 of the first die 341 and is disposed a predetermined gap away from the rear face cavity face 372 of the third die 347.

Therefore, when the first and third dies 341, 347 are closed, the front side cavity 350 formed by the first die 341 and the separator proper 116 and the rear side cavity 371 formed by the third die 347 and the separator proper 116 extend around the outer edge 116a of the separator proper 116 and connect with each other.

As a result, the rear side molded layer 134 is guided to the outer edge 116a of the separator proper 116 and made to connect with the front side molded layer 132 extending to the outer edge 116a of the separator proper 116.

Because the outer edge 116a of the separator proper 116 can be covered with the front side molded layer 132 and the rear side molded layer 134, i.e. the seal 118, corrosion of the separator proper 116 is prevented from occurring.

After the separator proper 116 has been covered with the front side molded layer 132 and the rear side molded layer 134, the first die 341 is opened by being moved as shown by the arrows z1.

In FIG. 22B, the separator 115 obtained by covering the separator proper 116 with the seal 118 is released from the first and third dies 341, 347 and the process of manufacturing the separator 115 ends.

As explained in the fourth embodiment of FIG. 18 through FIG. 22B, with an injection-molding method according to this invention, by molten silicone rubber 59 guided to the second gate 355 being guided efficiently to the rear side cavity 371 through a connecting passage 374, the rear side cavity 371 can be filled with silicone rubber 59 rapidly.

By this means it is possible to mold a front side molded layer 132 and a rear side molded layer 134 respectively to the front face 131 and the rear face 133 of a separator proper 116 in a short time.

Also, with the simple construction of just providing the first and second gates 354, 355 and the switching valve 353 in the first die 341 and providing the connecting passage 374 in the third die 347, it is possible to mold a seal (molded layer) 118 to the front face 131 and the rear face 133 of a separator proper 116 in a short time.

By this means it is possible to provide an economical injection-molding apparatus 340.

Next, an injection-molding apparatus 380 (see FIG. 23) for molding a seal 118 (see FIG. 9) will be described.

FIFTH EMBODIMENT

Figure 23:
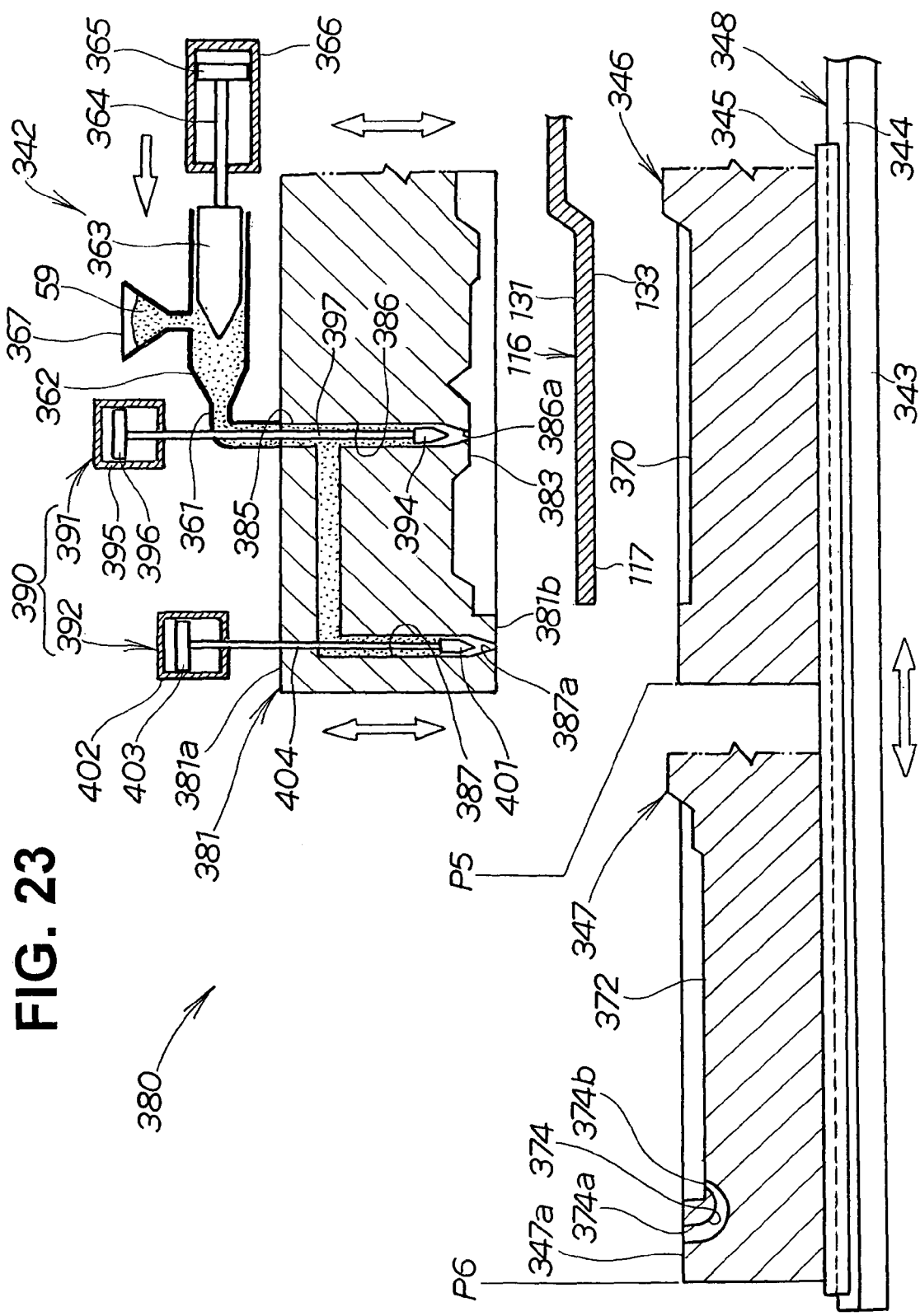
FIG. 23 is a sectional view showing an injection-molding apparatus according to a fifth embodiment of the invention.

As shown in FIG. 23, in the injection-molding apparatus 380, just its first die 381 is different from the first die 341 of the fourth embodiment, and the rest of the construction is the same as the fourth embodiment.

That is, the injection-molding apparatus 380 is made up of a first die 381 provided raise/lowerably as shown with arrows, injecting means 342 provided on this first die 381, a bed 343 disposed below the first die 381, moving means 348 for sliding a slider 345 along a guide rail 344 of this bed 343, and second and third dies 346, 347 mounted on this slider 345.

The first die 381 has a front side cavity face 383 for forming a front side cavity 382 (see FIG. 24B) with the front face 131 of the separator proper 116 when the first die 381 is clamped to the second die 346.

Also, the first die 381 has a runner 385 opening at its top face 381a and first and second gates 386, 387 branching from this runner 385.

The first gate 386 is a flow passage having its outlet 386a opening at the front side cavity face 383. On the other hand, the second gate 387 is a flow passage having its outlet 387a opening at the bottom face 381b of the first die 381, avoiding the front side cavity face 383.

The first gate 386 and the second gate 387 are provided with switching means 390 for opening and closing the outlets 386a, 387a.

This switching means 390 is made up of a first switching part 391 for opening and closing the outlet 386a of the first gate 386 and a second switching part 392 for opening and closing the outlet 387a of the second gate 387.

The first switching part 391 has a first valve member 394 provided in the first gate 386 and a first cylinder unit 395 connected to this first valve member 394.

Specifically, the first switching part 391 is constructed with the first valve member 394 connected via a rod 397 to a piston 396 of the first cylinder unit 395 so that by the piston 396 being moved in the up-down direction the first valve member 394 moves between a closed position in which it closes the outlet 386a and an open position in which it opens the outlet 386a.

The second switching part 392 has a second valve member 401 provided in the second gate 387 and a second cylinder unit 402 connected to this second valve member 401.

Specifically, the second switching part 392 is constructed with the second valve member 401 connected via a rod 404 to a piston 403 of the second cylinder unit 402 so that by the piston 403 being moved in the up-down direction the second valve member 401 moves between a closed position in which it closes the outlet 387a and an open position in which it opens the outlet 387a.

By the first and second cylinder units 395, 402 of the switching means 390 being controlled, switching is carried out between a state in which the outlet 386a of the first gate 386 is open and the outlet 387a of the second gate 387 is closed and a state in which the outlet 386a of the first gate 386 is closed and the outlet 387a of the second gate 387 is open.

Next, an injection-molding method for molding a seal 118 (see FIG. 9) to the peripheral part 117 of a separator proper 116 using the injection-molding apparatus 380 will be described, on the basis of FIG. 23 through FIG. 27.

First, the injection-molding apparatus 380 shown in FIG. 23 is prepared. That is, a first die 381 having a front side cavity face 383 that will cover the front face 131 of a separator proper 116, a first gate 386 opening at the front side cavity face 383, a second gate 387 avoiding the front side cavity face 383 and switching means 390 for opening either an outlet 386a of the first gate 386 or an outlet 387a of the second gate 387 is prepared; a second die 346 having a receiving face 370 that will receive the rear face 133 of the separator proper 116 without forming a cavity is prepared; and a third die 347 having a rear side cavity face 372 that will cover the rear face 133 of the separator proper 116 and a connecting passage 374 for connecting the second gate 387 to a rear side cavity 371 (see FIG. 26B) is prepared.

Figure 24A:
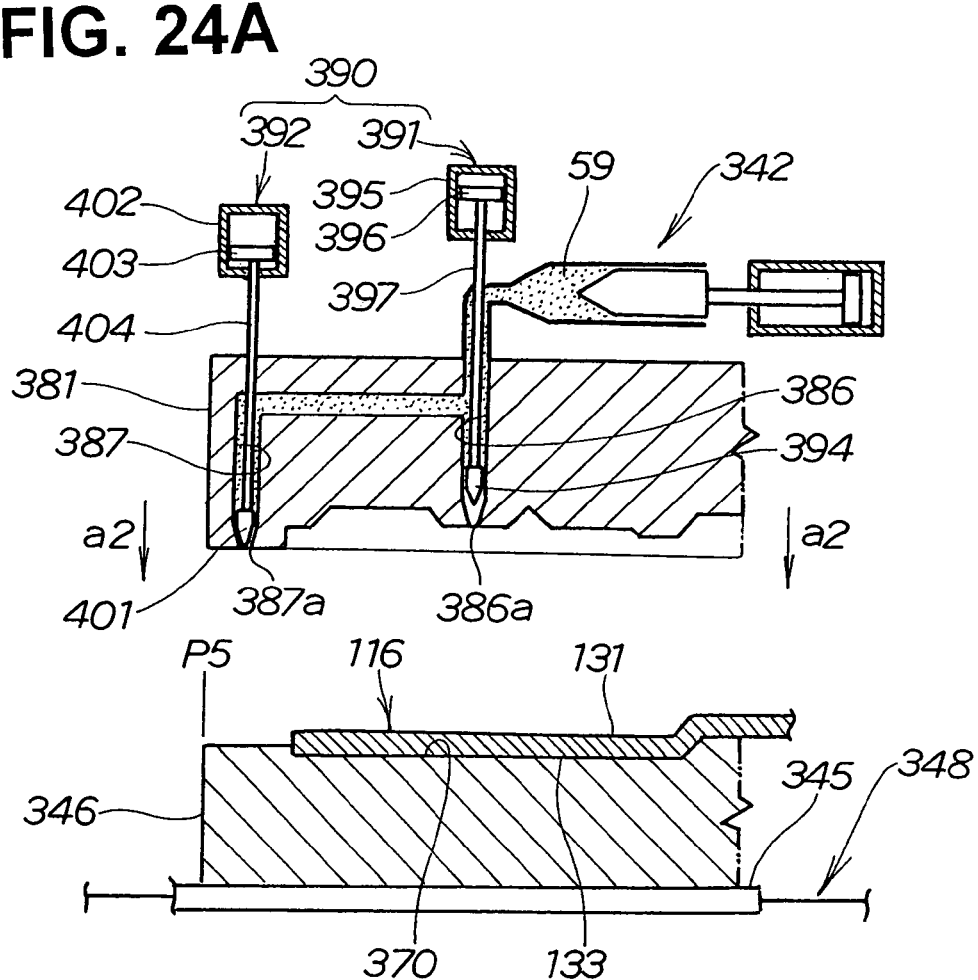
FIG. 24A and FIG. 24B are explanatory views showing an example of injecting molten silicone rubber into a front side cavity in an injection-molding method of the fifth embodiment.
Figure 24B:
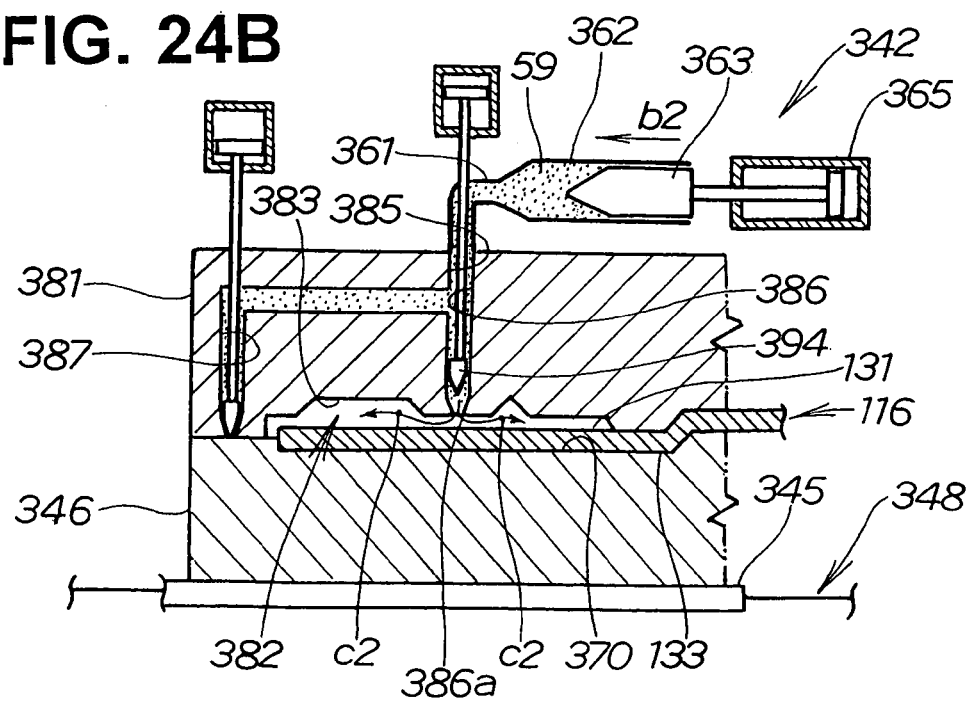

FIG. 24A and FIG. 24B are explanatory views showing an example of injecting molten silicone rubber into a front side cavity in the injection-molding method of the fifth embodiment.

In FIG. 24A, by the slider 345 being moved with the moving means 348, the second die 346 is set in the facing position P5 and the second die 346 is thus brought to face the first die 381.

Then, by a separator proper 116 being received onto the receiving face 370 of the second die 346, the rear face 133 of the separator proper 116 is brought into contact with the receiving face 370.

In this state, by the first die 381 being lowered as shown by the arrows a2, the first and second dies 381, 346 are clamped together.

At this time, the first and second cylinder units 395, 402 of the switching means 390 are controlled to the state wherein the outlet 386a of the first gate 386 is open and the outlet 387a of the second gate 387 is closed.

In FIG. 24B, by the separator proper 116 being sandwiched between the first die 381 and the second die 346, a front side cavity 382 is formed by the front face 131 of the separator proper 116 and the front side cavity face 383 of the first die 381.

Then, the plunger 363 is moved with the piston 365 of the injecting means 342 as shown by the arrow b2. As a result, molten silicone rubber 59 in the injection cylinder 362 is passed through the supply conduit 361, the runner 385 and the first gate 386 and injected into the front side cavity 382 through the outlet 386a as shown by the arrows c2.

Figure 25A:
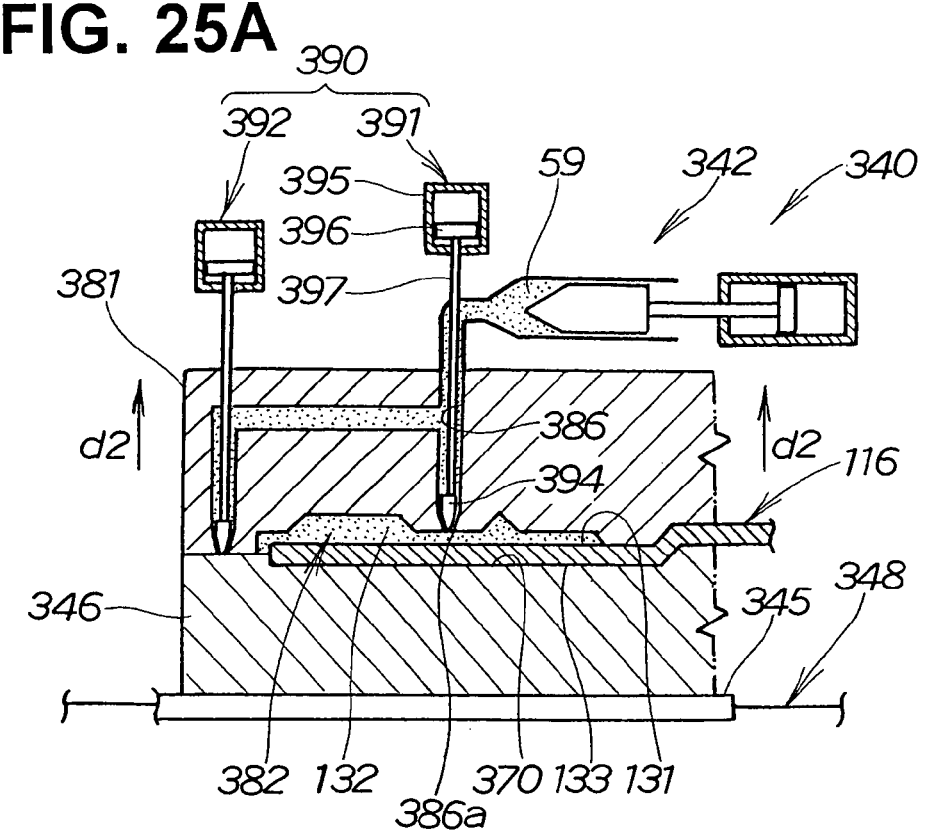
FIG. 25A and FIG. 25B are explanatory views showing an example of molding a front side molded layer to a separator proper in the injection-molding method of the fifth embodiment.
Figure 25B:
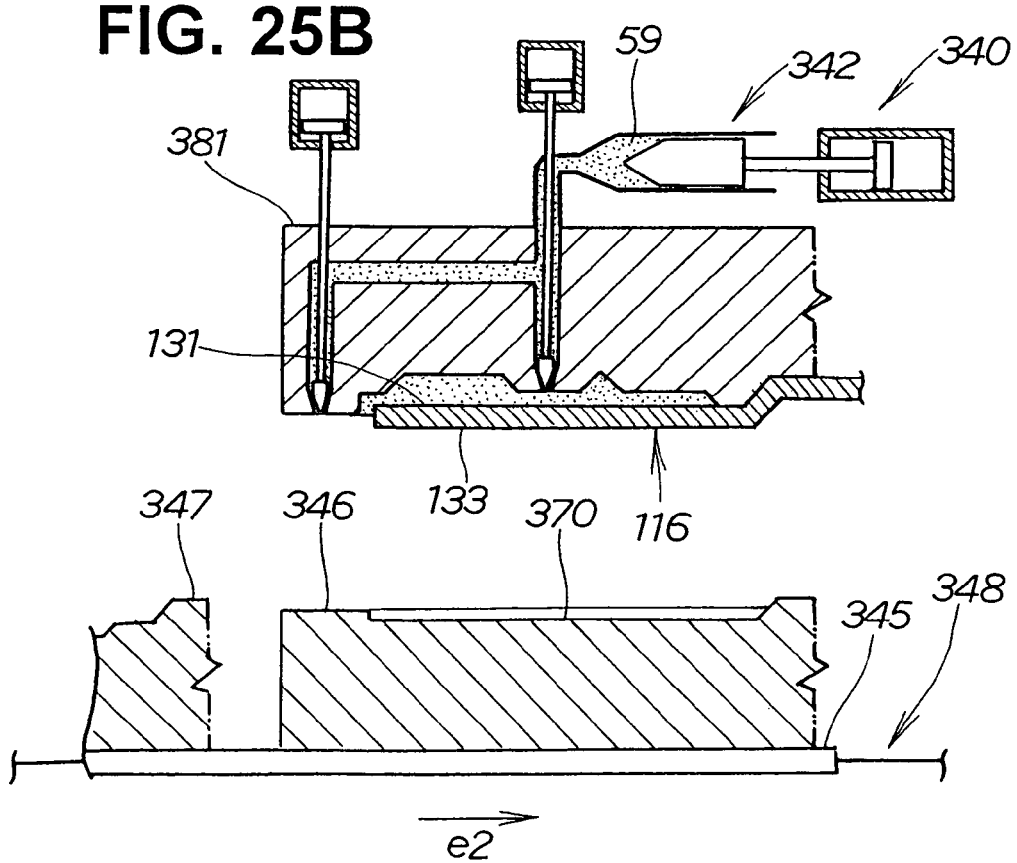

FIG. 25A and FIG. 25B are explanatory views showing an example of molding a front side molded layer on a separator proper in the injection-molding method of the fifth embodiment.

In FIG. 25A, by molten silicone rubber 59 being injected into the front side cavity 382, a front side molded layer 132 is molded to the front face 131 of the separator proper 116.

Next, after the first cylinder unit 395 is controlled by the switching means 390 to close the outlet 386a of the first gate 386, the first die 381 is moved as shown by the arrows d2 to open the mold.

In FIG. 25B, when the first die 381 is opened, by the separator proper 116 moving together with the first die 381, the separator proper 116 is removed from the second die 346.

Then, the moving means 348 is operated to move the slider 345 as shown by the arrow e2.

Figure 26A:
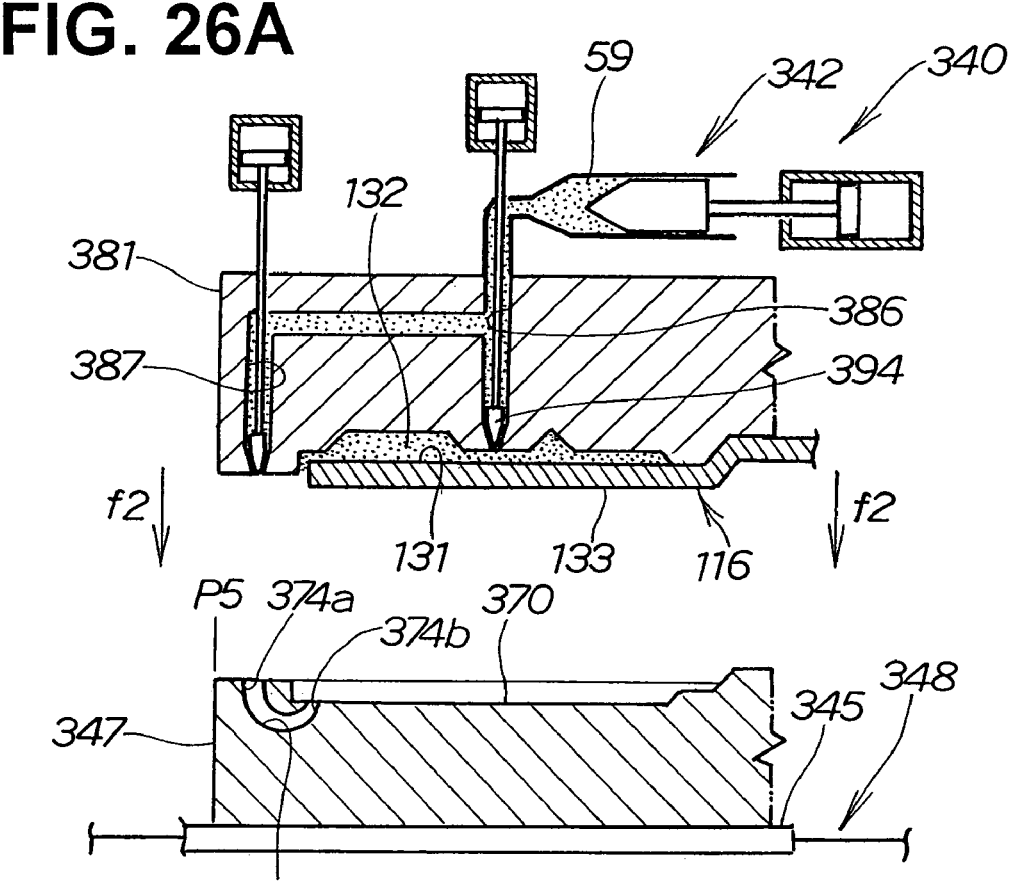
FIG. 26A and FIG. 26B are explanatory views showing an example of injecting molten silicone rubber into a rear side cavity in the injection-molding method of the fifth embodiment.
Figure 26B:
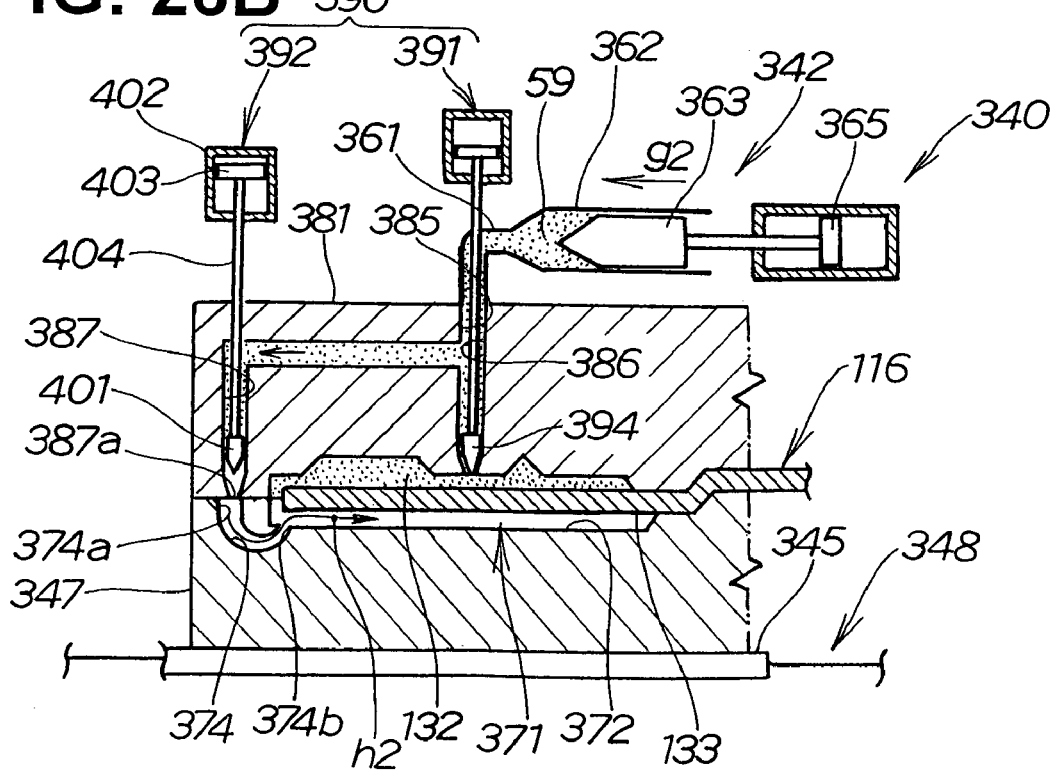

FIG. 26A and FIG. 26B are explanatory views showing an example of injecting molten silicone rubber into a rear side cavity in the injection-molding method of the fifth embodiment.

In FIG. 26A, the third die 347 is set to the facing position P5 and the third die 347 is thus brought to face the first die 381.

Next, by the first die 381 being lowered as shown by the arrows f2, while the front side molded layer 132 is still soft the first and third dies 381, 347 are clamped together. This completes a mold-closing with the second die 346 (see FIG. 25B) replaced with the third die 347.

In FIG. 26B, by the first die 381 and the third die 347 being clamped together sandwiching the separator proper 116, a rear side cavity 371 is formed by the rear face 133 of the separator proper 116 and the rear side cavity face 372 of the third die 347.

At this time, the inlet 374a faces the outlet 387a of the second gate 387 and the second gate 387 is connected to the rear side cavity 371 by the connecting passage 374.

Next, the switching means 390 controls the second cylinder unit 402 to switch to a state wherein the outlet 387a of the second gate 387 is open.

Then, by the plunger 363 being moved with the piston 365 of the injecting means 342 as shown by the arrow g2, molten silicone rubber 59 in the injection cylinder 362 is injected through the supply conduit 361, the runner 385, second gate 387 and the connecting passage 374 into the rear side cavity 371 as shown by the arrow h2.

By molten silicone rubber 59 guided to the second gate 387 being guided into the rear side cavity 371 through the connecting passage 374 like this, the rear side cavity 371 can be filled with molten silicone rubber 59 efficiently and rapidly.

Figure 27A:
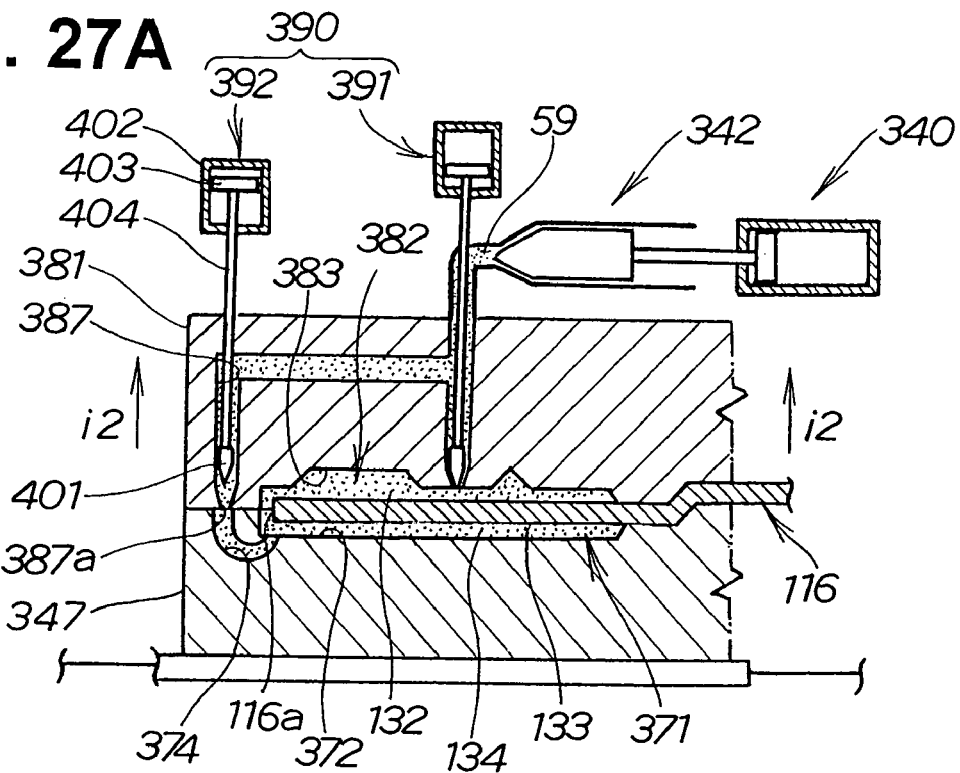
FIG. 27A and FIG. 27B are explanatory views showing an example of releasing a separator from first and third dies in the injection-molding method of the fifth embodiment.
Figure 27B:
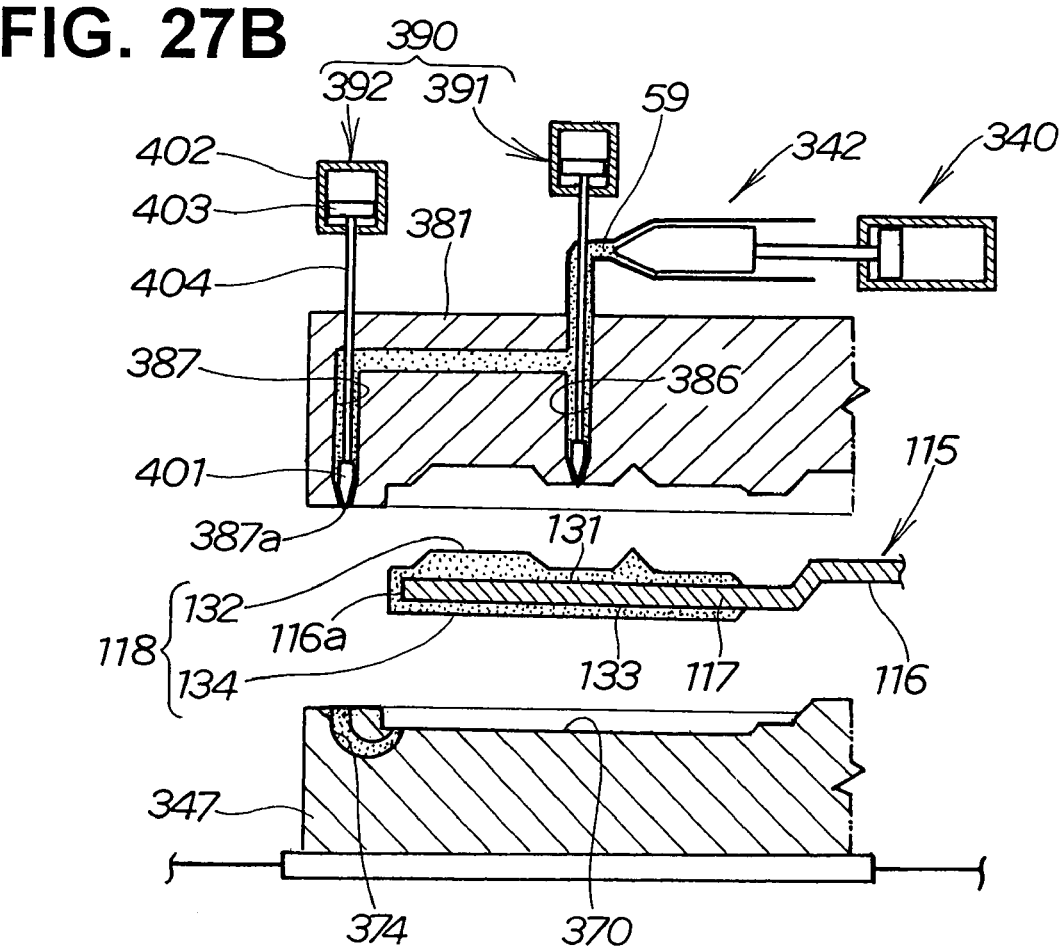
Figure 28:
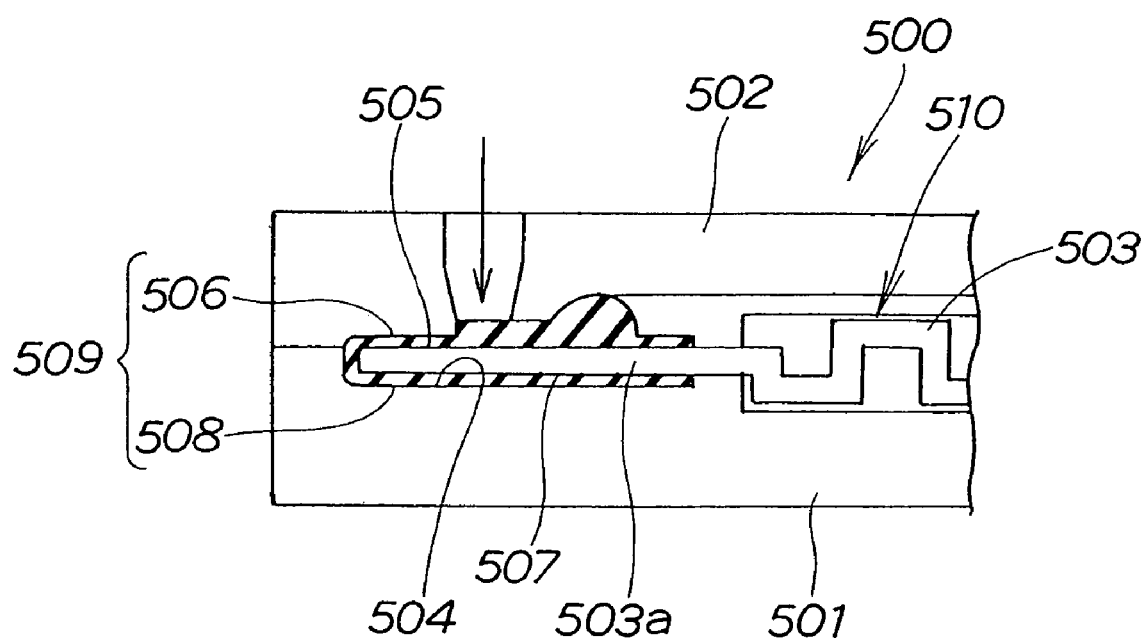
FIG. 28 is a sectional view showing a related art example of molding a seal to a peripheral part of a separator for use in a fuel cell.

FIG. 27A and FIG. 27B are explanatory views showing an example of releasing a separator from the first and third dies in the injection-molding method of the fifth embodiment.

In FIG. 27A, molten silicone rubber 59 is injected into the rear side cavity 371 to mold a rear side molded layer 134 to the rear face 133 of the separator proper 116.

Here, the outer edge 116a of the separator proper 116 is disposed a predetermined gap away from the front side cavity face 351 of the first die 341 and is disposed a predetermined gap away from the rear face cavity face 372 of the third die 347.

Therefore, when the first and third dies 381, 347 are clamped together, the front side cavity 382 formed by the first die 381 and the separator proper 116 and the rear side cavity 371 formed by the third die 347 and the separator proper 116 pass around the outer edge 116a of the separator proper 116 and connect with each other.

By this means it is possible to guide the rear side molded layer 134 to the outer edge 116a of the separator proper 116 and connect it with the front side molded layer 132 extending to the outer edge 116a of the separator proper 116.

Because the outer edge 116a of the separator proper 116 can be covered by the front side molded layer 132 and the rear side molded layer 134, i.e. the seal 118, corrosion is prevented from occurring in the separator proper 116.

After the separator proper 116 is covered with the front side molded layer 132 and the rear side molded layer 134, the second cylinder unit 402 is controlled by the switching means 390 to close the outlet 387a of the second gate 387. In this state, the first die 381 is moved as shown by the arrows i2 to open the mold.

In FIG. 27B, the separator 115 obtained by covering the separator proper 116 with the seal 118 is released from the first and third dies 381, 347 and the process of manufacturing the separator 115 ends.

As explained in the fifth embodiment of FIG. 23 through FIG. 27B, with an injection-molding method according to the invention, like the fourth embodiment, molten silicone rubber 59 guided to the second gate 387 is guided efficiently into the rear side cavity 371 through the connecting passage 374, and the rear side cavity 371 is filled with silicone rubber 59 rapidly.

By this means it is possible to mold a front side molded layer 132 and a rear side molded layer 134 respectively to the front face 131 and the rear face 133 of a separator proper 116 in a short time.

Also, with the simple construction of just providing the first and second gates 386, 387 and the switching means 390 in the first die 381 and providing the connecting passage 374 in the third die 347, it is possible to mold a seal (molded layer) 118 to the front face 131 and the rear face 133 of a separator proper 116 in a short time.

By this means it is possible to provide an economical injection-molding apparatus 380.

Although in the foregoing first through fifth embodiments examples were described wherein silicone rubber 59 was used as the molding material, the invention is not limited to this, and it is also possible to use some other rubber material or a resin material or the like as the molding material.

Although in the foregoing the first through fifth embodiments a separator 16, 116 was described as an example of a plate-shaped member, the plate-shaped member is not limited to this and the invention can also be applied to other plate materials.

Also, although in the foregoing first embodiment an example was described wherein as an example three support projections 66 were provided on the rear side cavity face 64 of the third die 47, the number of support projections 66 can be selected freely.

Although in the foregoing first embodiment an injection-molding apparatus 40 was described wherein first through third dies 41, 46, 47 were disposed horizontally and the first die 41 was moved in the up-down direction to effect mold-opening and mold-closing, there is no limitation to this, and the invention can also be applied to an injection-molding apparatus in which the first through third dies 41, 46, 47 are disposed vertically and the first die 41 is moved horizontally in a sideways direction to effect mold-opening and mold-closing.

Also, whereas in the foregoing second and third embodiments injection-molding apparatus 140, 200 were described in which a first die 141, 201 and a second die 143, 202 were disposed horizontally and the first die 141, 201 was moved in the up-down direction to effect mold-opening and mold-closing, there is no limitation to this, and the invention can also be applied to an injection-molding apparatus in which the first die 141, 201 and the second die 143, 202 are disposed vertically and the first die 141, 201 is moved horizontally in a sideways direction to effect mold-opening and mold-closing.

Whereas in the foregoing fourth and fifth embodiments injection-molding apparatus 340, 380 were described in which a first die 341, 381 and a second and third dies 346, 347 were disposed horizontally and the first die 341, 381 was moved in the up-down direction to effect mold-opening and mold-closing, there is no limitation to this, and the invention can also be applied to an injection-molding apparatus in which the first die 341, 381 and the second and third dies 346, 347 are disposed vertically and the first die 341, 381 is moved horizontally in a sideways direction to effect mold-opening and mold-closing.

Also, although in the foregoing first embodiment an example was described wherein a second die 46 and a third die 47 were mounted on a slider 45 and the second die 46 and the third die 47 were moved to required positions by the slider 45 being moved along a guide rail 44, as another example, it is also possible to mount the second die 46 and the third die 47 on a rotating plate and move the second die 46 and the third die 47 to the required positions by turning the rotating plate.

Whereas in the foregoing fourth and fifth embodiments examples were described wherein a second die 346 and a third die 347 were mounted on a slider 345 and the second die 346 and the third die 347 were moved to required positions by the slider 345 being moved along a guide rail 344, as another example, it is also possible to mount the second die 346 and the third die 347 on a rotating plate and move the second die 346 and the third die 347 to the required positions by turning the rotating plate.

Although in the foregoing first and fourth and fifth embodiments examples were described in which air cylinders were used as the actuators of moving means 48, 348, there is no limitation to this and it is also possible to use other actuators such as hydraulic cylinders, ball screws and motors.

Whereas in the fourth embodiment an example was described in which a valve switched by the operation of a motor was used as the switching valve 353, the switching valve is not limited to this and it is also possible to use some other switching valve such as a solenoid valve.

INDUSTRIAL APPLICABILITY

As is clear from the foregoing description this invention improves technology for molding molded layers such as seals to both sides of a plate-shaped member, and therefore the invention is useful in the production of plate-shaped bodies such as separators for use in fuel cells.

The invention claimed is:

1. An injection-molding method for covering a front face of a plate-shaped member with a front side molded layer by injection-molding using a first die and a second die and a rear face of the plate-shaped member with a rear side molded layer by injection-molding using the first die and a third die, the injection-molding method comprising the steps of:

preparing the first die having a front side cavity face provided in opposed relation to a mating face of the second die for covering the front face of the plate-shaped member, a first gate opening at the front side cavity face and extending substantially perpendicularly to the mating face of the second die, a second gate provided in such a manner as to bypass the front side cavity face and to open at a face to be mated with the second die and having a portion extending from an opening at the face to be mated with the second die substantially perpendicularly to the face to be mated with the second die, and switching means for guiding molding material to either one of the first and second gates;

preparing the second die having a receiving face for receiving the rear face of the plate-shaped member;

preparing the third die having a rear side cavity face for covering the rear face of the plate-shaped member, and a substantially J-shaped connecting passage opening at the rear side cavity face and at a face to be mated with the first die so as to fluidly connect the second gate to the rear side cavity face and having a portion extending from an opening at the face to be mated with the first die substantially perpendicularly to the face to be mated with the first die;

sandwiching the plate-shaped member with the first die and the second die and forming a front side cavity with the front side cavity face of the first die and the front face of the plate-shaped member;

injecting a molding material through the first gate into the front side cavity to mold the front side molded layer;

replacing the second die with the third die and thereby forming a rear side cavity with the rear side cavity face of the third die and the rear face of the plate-shaped member; and injecting a molding material from the second gate through the connecting passage into the rear side cavity to mold the rear side molded layer.

* * * * *

UNITED STATES PATENT AND TRADEMARK OFFICE
CERTIFICATE OF CORRECTION

PATENT NO.        : 7,749,419 B2                                                      Page 1 of 1
APPLICATION NO.   : 10/540329
DATED             : July 6, 2010
INVENTOR(S)       : Kimura et al.

It is certified that error appears in the above-identified patent and that said Letters Patent is hereby corrected as shown below:

On the Title Page, in Field (30), under "Foreign Application Priority Data", in Column 1,
    Line 3, delete "2002-013877" and insert -- 2003-013877 --

Signed and Sealed this

Second Day of November, 2010

David J. Kappos
*Director of the United States Patent and Trademark Office*